(12) United States Patent
Baldwin et al.

(10) Patent No.: US 11,277,587 B1
(45) Date of Patent: Mar. 15, 2022

(54) ELECTRICAL WALL PLATE

(71) Applicants: Jeffrey P. Baldwin, Anthem, AZ (US); John E. Klein, Chandler, AZ (US); Ryan Liebengood, Gilbert, AZ (US)

(72) Inventors: Jeffrey P. Baldwin, Anthem, AZ (US); John E. Klein, Chandler, AZ (US); Ryan Liebengood, Gilbert, AZ (US)

( * ) Notice: Subject to any disclaimer, the term of this patent is extended or adjusted under 35 U.S.C. 154(b) by 0 days.

(21) Appl. No.: 16/351,442

(22) Filed: Mar. 12, 2019

Related U.S. Application Data

(60) Provisional application No. 62/641,474, filed on Mar. 12, 2018.

(51) Int. Cl.
| | |
|---|---|
| *H04N 7/18* | (2006.01) |
| *H01R 13/74* | (2006.01) |
| *H01R 13/66* | (2006.01) |
| *H01H 9/02* | (2006.01) |
| *H04N 5/225* | (2006.01) |
| *H04N 1/32* | (2006.01) |
| *H02G 3/08* | (2006.01) |
| *H02G 3/14* | (2006.01) |

(52) U.S. Cl.
CPC ............... *H04N 7/18* (2013.01); *H01H 9/02* (2013.01); *H01R 13/6683* (2013.01); *H01R 13/74* (2013.01); *H02G 3/081* (2013.01); *H04N 1/32358* (2013.01); *H04N 5/2253* (2013.01); *H02G 3/14* (2013.01)

(58) Field of Classification Search
CPC .... H04N 7/18; H04N 1/32358; H04N 5/2253; H01H 9/02; H01R 13/6683; H01R 13/74; H02G 3/081
See application file for complete search history.

(56) References Cited

U.S. PATENT DOCUMENTS

| | | | |
|---|---|---|---|
| 6,993,417 B2 * | 1/2006 | Osann, Jr. ............. | H04L 67/125 700/291 |
| 2008/0024605 A1 * | 1/2008 | Osann, Jr. ............. | G06Q 10/00 348/143 |
| 2014/0320663 A1 * | 10/2014 | Chien ................... | F21S 10/002 348/159 |

* cited by examiner

*Primary Examiner* — Hesham K Abouzahra
(74) *Attorney, Agent, or Firm* — Booth Udall Fuller, PLC; Kenneth C. Booth

(57) ABSTRACT

An electrical wall plate includes at least one electrical device opening extending through the wall plate and a camera electrically connected to a power connector configured to electrically connect to an electrical device, when the electrical wall plate is mounted to the electrical device, and a corresponding of method of capturing video images is provided.

20 Claims, 19 Drawing Sheets

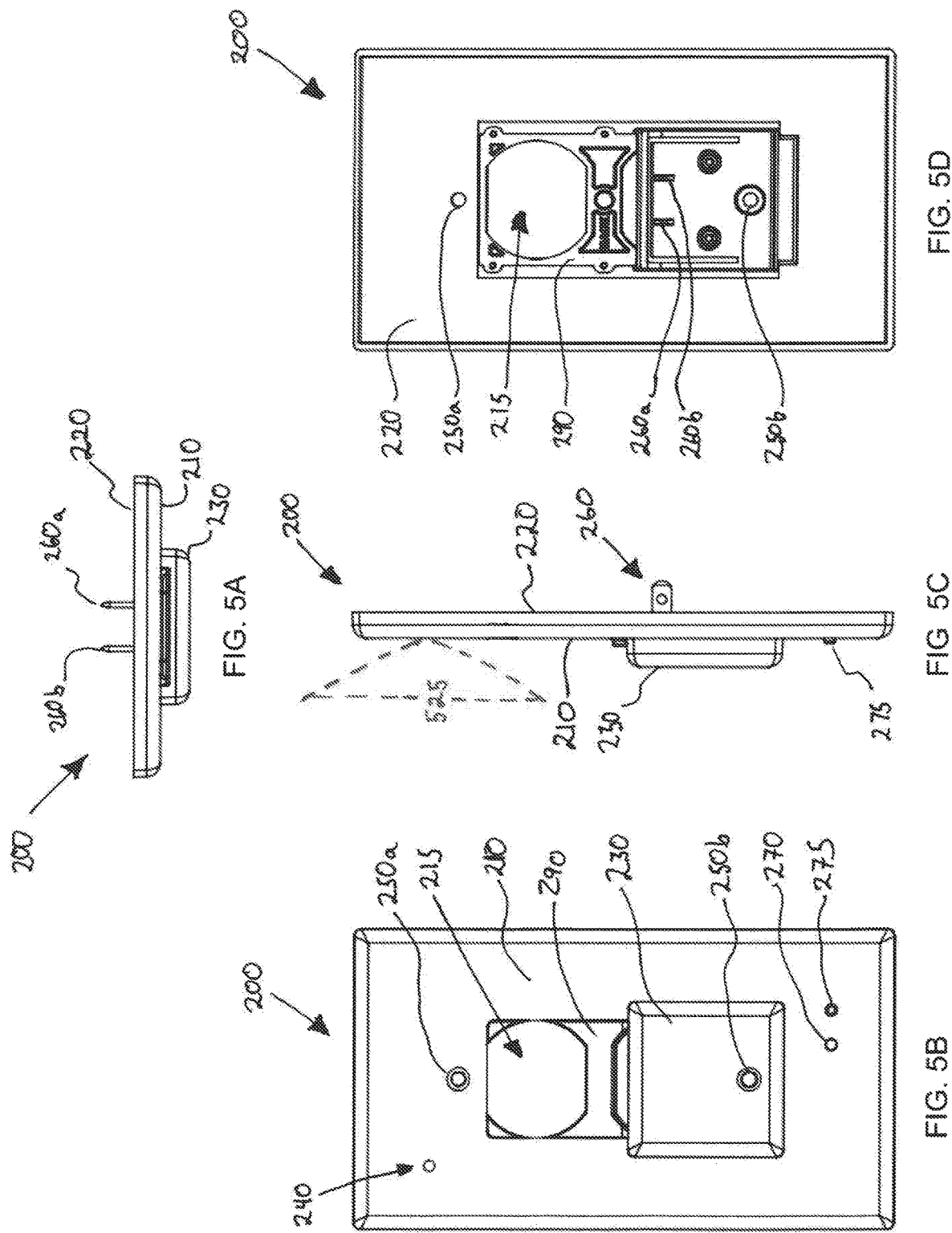

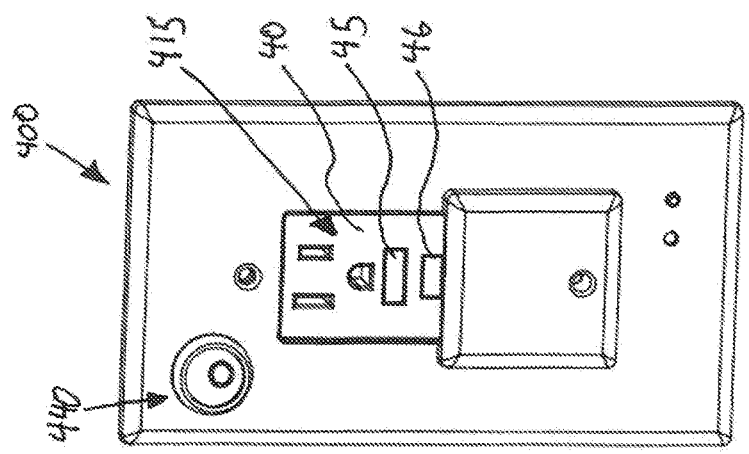
FIG. 7C
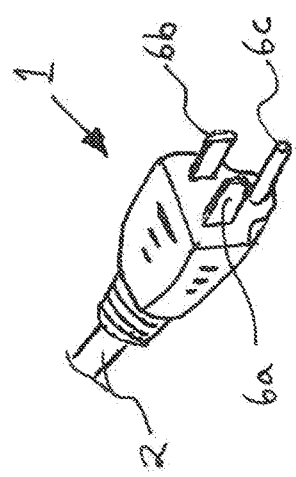
FIG. 6
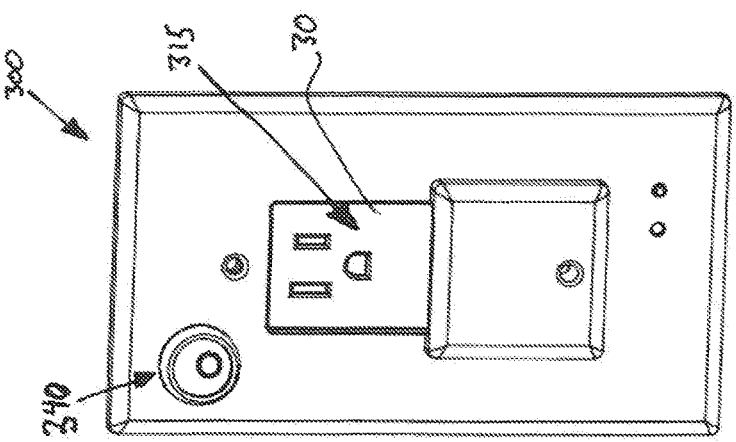
FIG. 7B
FIG. 7A

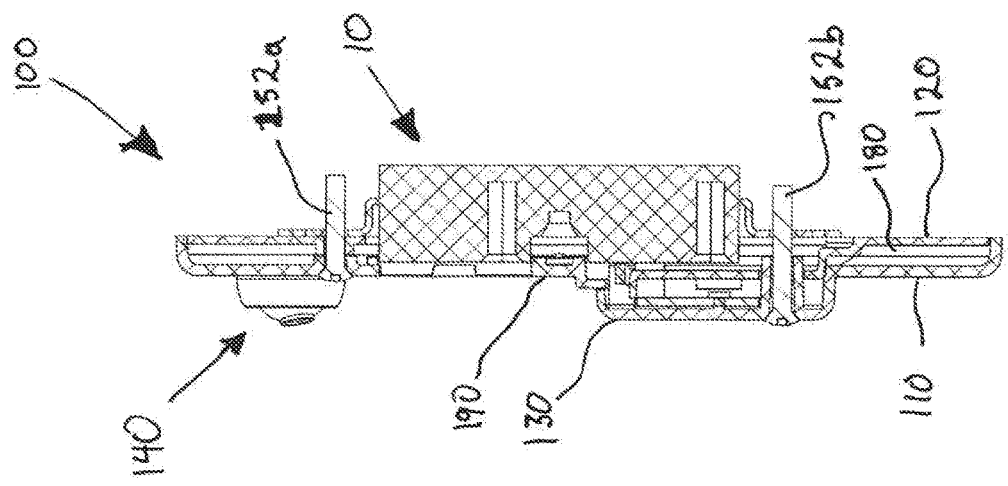
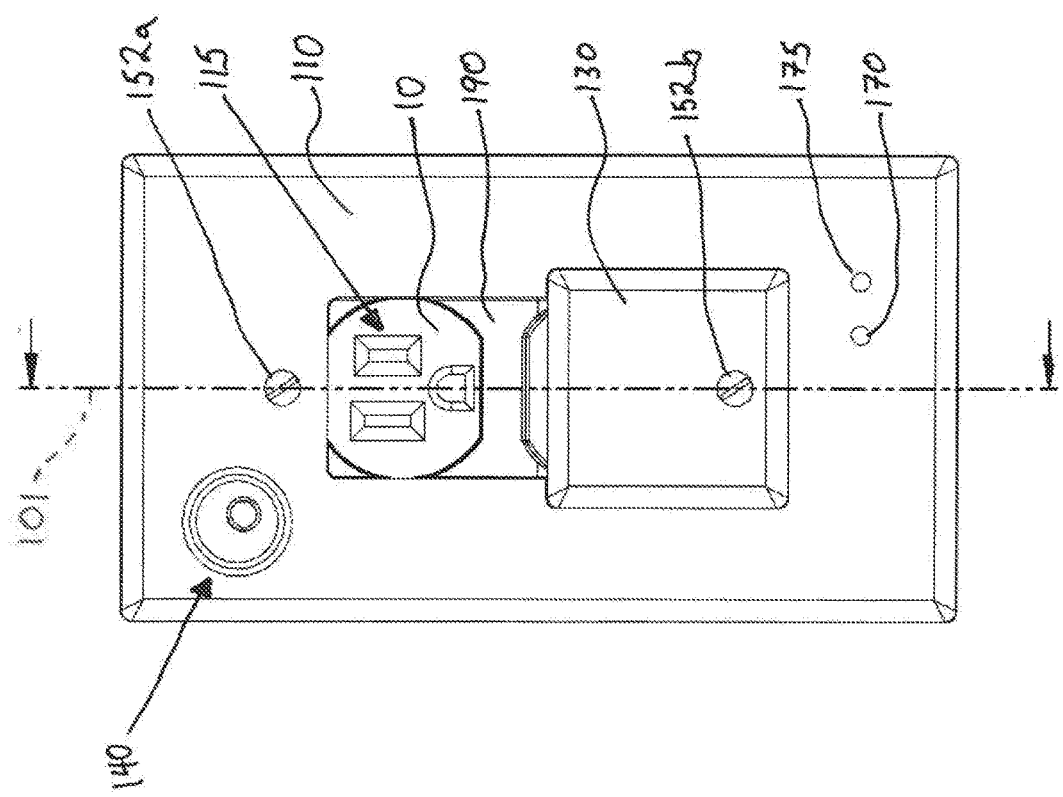
FIG. 10B
FIG. 10A

ELECTRICAL WALL PLATE

CROSS REFERENCE TO RELATED APPLICATION(S)

This application claims the benefit of U.S. Provisional Patent Application No. 62/641,474, filed Mar. 12, 2018, the disclosure of which is hereby incorporated entirely herein by reference.

BACKGROUND

Technical Field

The disclosure relates generally to electrical wall plates and, more particularly, to electrical wall plates having integral electronic components.

State of the Art

An electrical wall plate is a typical device used to prevent access to electrical wires and electrical receptacles therein. Conventional electrical wall plates commonly mount to electrical receptacles via connection by fasteners, such as screws, or by a mechanical fit involving interlocking components designed to secure the wall plate to the receptacle. Recently, some electrical wall plates have incorporated lights or other electronic components, thereby offering additional functionality beyond mere prevention of access to the electrical wires and receptacle. However, such electrical wall plate designs suffer from cumbersome and unsafe wiring arrangements, bulky design geometries, and/or infective communication abilities. Hence, a need exists for an electrical wall plate that securely mounts to an electrical receptacle, incorporates convenient power connection, includes an efficient design geometry integrating one or more electronic components, and affords effective communication ability.

SUMMARY

According to an aspect of the disclosure an electrical wall plate may comprise a front plate face having a center vertical axis, a rear plate face opposing the front plate face and having a center vertical axis congruent with the center vertical axis of the front plate face, so that there is a plane extending between the center vertical axis of the front plate face and the center vertical axis of the rear plate face, wherein the plane is perpendicular to at least a portion of both the front plate face and the rear plate face, at least one electrical device opening extending through the front plate face and the rear plate face, wherein the at least one electrical device opening is symmetrically bifurcated by the plane extending between the center vertical axis of the front plate face and the center vertical axis of the rear plate face, at least one box mounting screw opening, wherein the at least one box mounting screw opening is positioned so as to extend through both the front plate face and the rear plate face in a direction congruent with the plane extending between the center vertical axis of the front plate face and the center vertical axis of the rear plate face, and further wherein the at least one box mounting screw opening is configured to receive a box mounting screw so that the box mounting screw, when received, facilitates fastening of the electrical wall plate to an electrical device, a power connector extending in a direction away from the front plate face, and configured to connect with a power transmission conductor of the electrical device, and a camera integrated with the front plate face, in electrical connection with the power connector and configured to operate by power obtained from the electrical device when the power connector is connected to the power transmission conductor of the electrical device.

Particular embodiments may comprise one or more of the following features. The electrical device may be mounted in an electrical box. The electrical device may be an electrical receptacle. The at least one electrical device opening may be configured to permit a male conductive member of an electrical power plug to extend through the electrical device opening and engage with a female receiver of the electrical receptacle. The power connector may include at least two electrical plug blades and the power transmission conductor of the electrical receptacle is a female receiver configured to receive and conductively engage with the at least two electrical plug blades. The electrical device may be a light switch. The camera may operate with a swivel lens configured to move and point in different directions. The camera may operate with a wide-angle lens located in a key-hole aperture of the front plate face. A printed circuit board in electrical communication with the camera and the power connector. A transmitter. A button switch may be configured to facilitate manual operation of at least one of the camera or the transmitter. A light electrically connected to the power connector.

According to an aspect of the disclosure a method of capturing video images may comprise providing an electrical wall plate having at least two openings extending through the electrical wall plate and positioned so that each of the at least two openings is symmetrically centered along a center vertical plane oriented perpendicularly to the electrical wall plate, wherein the electrical wall plate further includes a power connector, a printed circuit board in electrical connection with the power connector, and a video camera in electrical connection with the printed circuit board, providing an electrical device, wherein the electrical device includes a power transmission conductor configured to electrically engage the power connector of the electrical wall plate, when the electrical wall plate is mounted to the electrical device, powering the camera with electricity obtained through an electrical connection of the electrical wall plate and the electrical device via engagement of the power connector of the electrical wall plate with the power transmission conductor of the electrical device, and capturing video images by the camera, when the camera is electrically powered by electricity obtained through electrical connection of the electrical wall plate and the electrical device.

Particular embodiments may comprise one or more of the following features. Storing the captured video images in a memory storage device electrically connected to the printed circuit board of the electrical wall plate. Transmitting the video images via a transmitter electrically connected to the printed circuit board of the electrical wall plate. The transmitter may transmit signals to a wireless local area network receiver. The transmitter may transmit signals to a wireless personal area network receiver. A button switch may be used on the electrical wall plate to facilitate pairing of the transmitter with a wireless receiver. The electrical device may comprise an electrical receptacle. The electrical device may comprise a light switch.

According to an aspect of the disclosure, an electrical wall plate may comprise a printed circuit board positioned between a front plate face and a rear plate face, at least one box mounting screw opening extending through the front plate face and the rear plate face, wherein the at least one box mounting screw opening is positioned to permit insertion and transversal by a box mounting screw in a manner wherein the box mounting screw, when inserted through the at least one box mounting screw opening, extends into a corresponding opening of an electrical device and extends into corresponding opening of an electrical box and facilitates fastening of the electrical wall plate to both the electrical device and the electrical box, and a camera positioned so that a lens of the camera captures a field of view exposed to the front plate face.

Particular embodiments may comprise one or more of the following features. The electrical device may be an electrical receptacle. The electrical device may be a light switch. The camera may include a pan, tilt and zoom lens configured to modify the direction and range of the field of view. A transmitter may be configured to transmit signals corresponding to video images captured by the camera. Memory storage configured to store video images captured by the camera. A receptacle opening may extend through the front plate face and the rear plate face, wherein the receptacle opening is configured to permit electrical plug blades of an electrical power plug to extend through the receptacle opening and conductively engage with a female receiver of an electrical receptacle to which the electrical wall plate has been mounted.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function The foregoing and other features, advantages and construction of the present disclosure will become more readily apparent and fully appreciated from the following more DETAILED DESCRIPTION of the particular embodiments and appended CLAIMS, in conjunction with the accompanying DRAWINGS.

BRIEF DESCRIPTION OF THE DRAWINGS

To further clarify the above and other advantages and features of the present disclosure, some of the embodiments will be described in detail, with reference to the following figures, wherein like designations denote like members. It is appreciated that these figures depict only illustrated embodiments pertinent to the present disclosure and are therefore not to be considered limiting of inventive scope. As such, the present disclosure will be set forth and explained with additional specificity and detail through the use of the accompanying drawings in which:

FIG. 5A illustrates a top view of the electrical wall plate of FIG. 4;

FIG. 5B illustrates a front view of the electrical wall plate of FIG. 4;

FIG. 5C illustrates a side view of the electrical wall plate of FIG. 4;

FIG. 5D illustrates a rear view of the electrical wall plate of FIG. 4;

FIG. 6 illustrates a perspective view of a common electrical power plug;

FIG. 7A illustrates a front perspective view an embodiment of an electrical wall plate partially mounted on an embodiment of an electrical device;

FIG. 7B illustrates a front perspective view of another embodiment of an electrical wall plate partially mounted on an embodiment of electrical device;

FIG. 7C illustrates a front perspective view of still another embodiment of an electrical wall plate partially mounted on an embodiment of electrical device;

FIG. 10A illustrates a front view of an embodiment of an electrical wall plate mounted to an embodiment of an electrical device;

FIG. 10B illustrates a side cross section view of the embodiments of the electrical wall plate mounted to the electrical device of FIG. 10A;

DETAILED DESCRIPTION

A detailed description of the hereinafter described embodiments of the disclosed apparatuses, systems and methods are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

Figure 1:
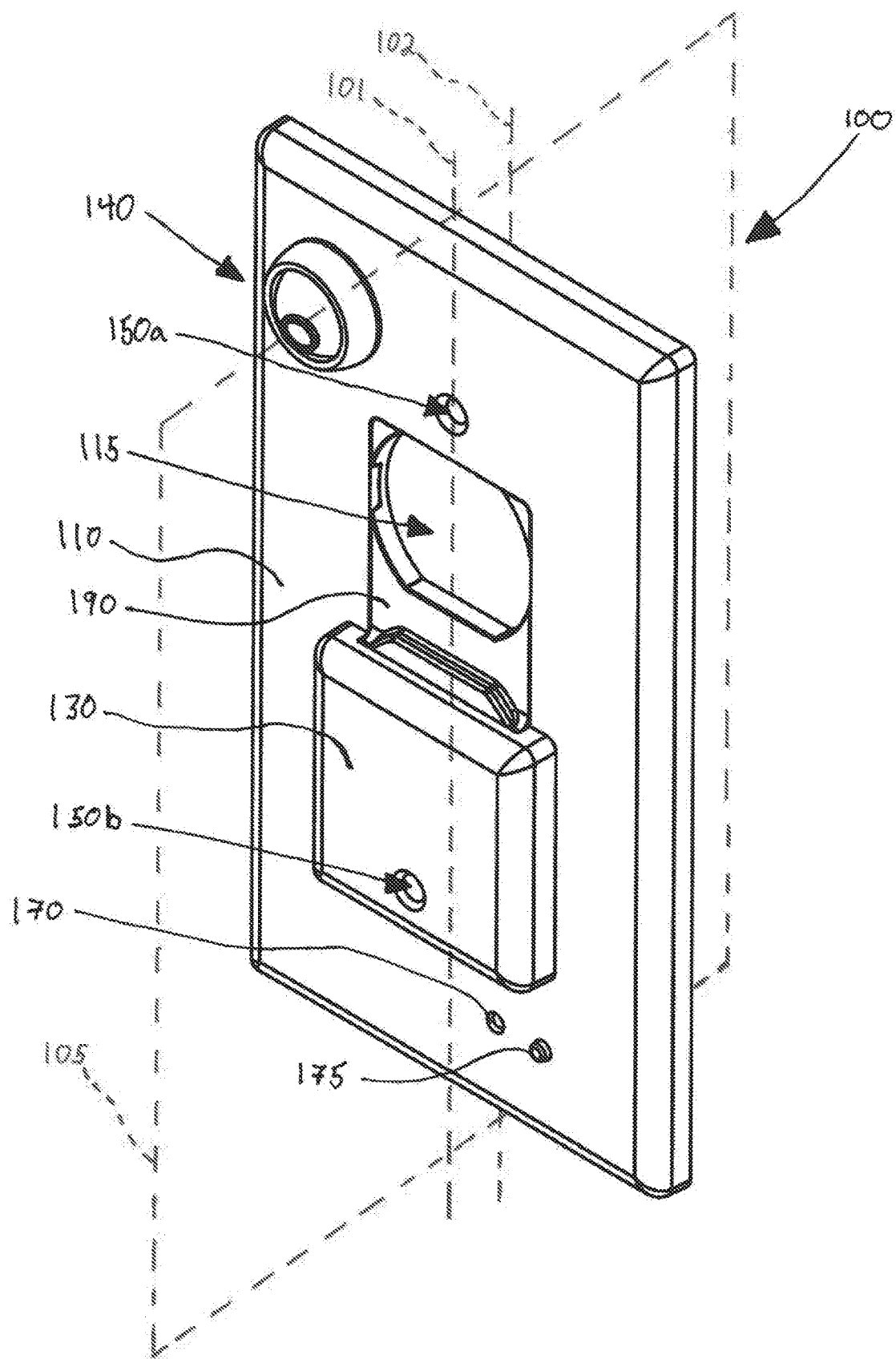
FIG. 1 illustrates a front perspective view of an embodiment of an electrical wall plate comprising an integral electronic component.
Figure 2:
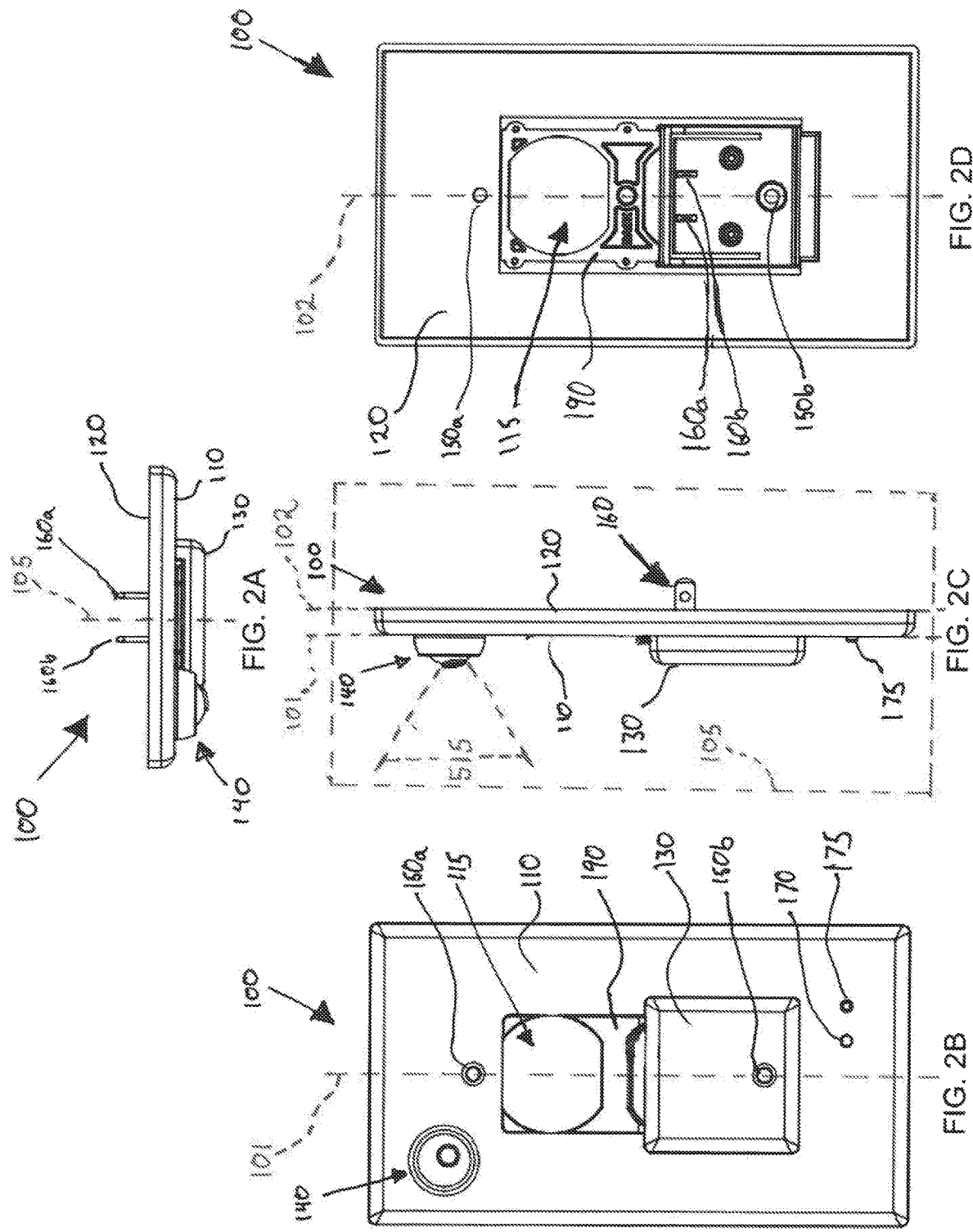
FIG. 2A illustrates a top view of the electrical wall plate of FIG. 1.
FIG. 2B illustrates a front view of the electrical wall plate of FIG. 1.
FIG. 2C illustrates a side view of the electrical wall plate of FIG. 1.
FIG. 2D illustrates a rear view of the electrical wall plate of FIG. 1.

Attempts have been made to provide an electrical wall plate including integrated electronic components, but those attempts have been structurally cumbersome, functionally inefficient and cost prohibitive. Referring to the drawings, FIG. 1 depicts a front perspective view of an embodiment of an electrical wall plate 100 comprising an integral electronic component, such as a camera 140, that solves the aforementioned problems. As depicted, the electrical wall plate 100 may include a front plate face 110. An electronic device opening 115 may extend through the front plate face 110 of the electrical wall plate 100. In addition, the electrical wall plate may include a housing 130. The housing 130 may house electronic components, such as an electrical power transformer, a transmitter, such as an antenna, a printed circuit board, a memory storage component, a battery, a microphone, a speaker, a sensor or multiple sensors, such as a smoke detector or a carbon monoxide detector, a communications port for connecting an external electronic device, a fragrance storage and release element, and/or a mechanical element such as a motor or a structural feature configured to movably extend from the housing 130, and/or other like components.

Embodiments of an electrical wall plate 100 may include an integral electronic component, such as a camera 140. Embodiments of the camera 140 may be configured with a movable lens that can be swiveled to point in different directions. Moreover, the camera 140 may include a lens having pan, tilt and zoom functionality, wherein the pan, tilt and zoom functionality may be facilitated by motors, servos, magnets, fluidic pressure devices, heated elements, pneumatic elements, or other features or combinations thereof facilitating movement of the lens. One or more openings, such as box mounting screw openings 150a and 150b, may extend through the electrical wall plate 100 and be positioned on the electrical wall plate 100 so as to correspond to similar openings or mechanical features of an electrical device, such as a light switch or and electrical receptacle, or socket fixture. The box mounting screw openings 150a and 150b may facilitate mounting of the electrical wall plate 100 to the electrical device and also to an electrical box. Depending on the type of electrical device to which the electrical wall plate 100 is mounted, an adapter 190 may be included to facilitate structural correspondence with the electrical device. For example, the adapter 190 may be shaped create an electrical device opening 115 having a shape corresponding with the geometry of a common duplex-type electrical receptacle. Additionally, embodiments of an electrical wall plate 100 may include a light 170, such as an LED, as well as a button switch 175. The button switch 175 may be positioned for manual accessibility and operation.

The front plate face 110 may be defined, at least in part, by a center vertical axis 101 that is centered horizontally with regard to the front plate face 110 and extends vertically through the entirety of the vertical dimension comprising the front face plate 110. In addition, a rear plate face 120 may also be defined, at least in part, by a center vertical axis 102, that aligned congruent with the center vertical axis 101 of the front plate face 110, so that there is a plane 105 extending between the center vertical axis 101 of the front plate face 110 and the center vertical axis 102 of the rear plate face 120, wherein the plane 105 is perpendicular to at least a portion of both the front plate face 110 and the rear plate face 120. The electrical device opening 115 may be symmetrically bifurcated by the plane 105 extending between the center vertical axis 101 of the front plate face 110 and the center vertical axis 102 of the rear plate face 120. The electrical device opening 115 may have similar geometric dimensions on either side of the plane 105, wherein the plane 105 may be horizontally centered in the opening 115 and extend perpendicularly through the opening, with regard to portions of the front plate face 110 and the rear plate face 120.

Figure 8B:
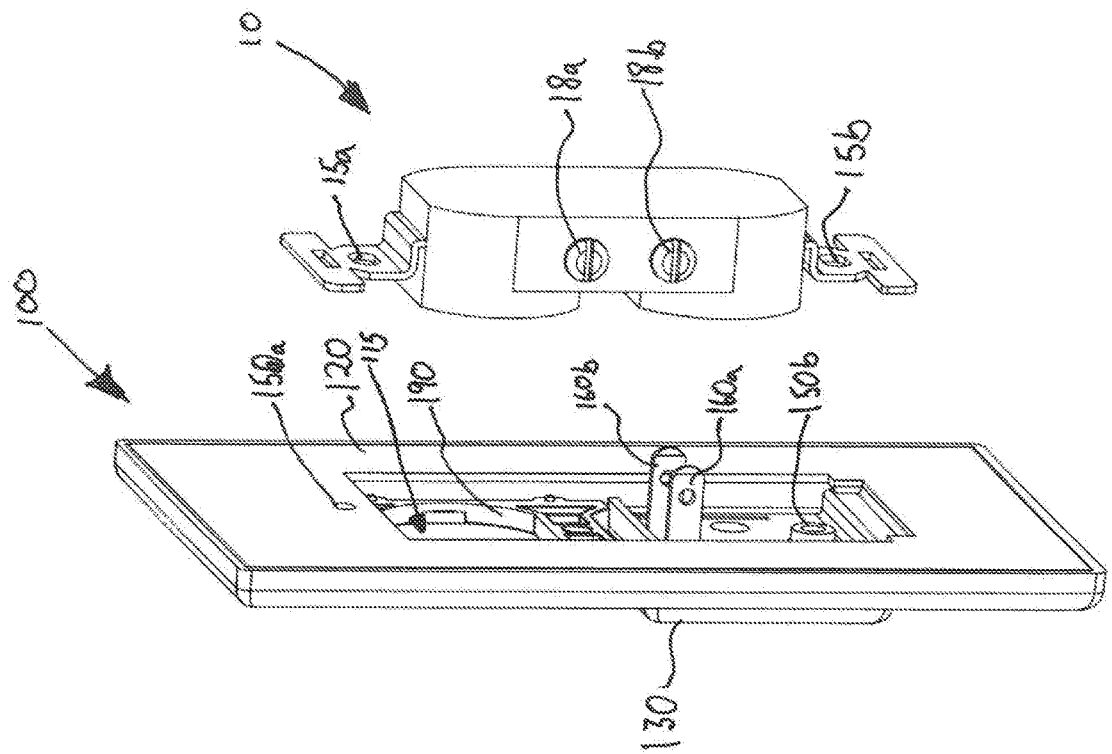
FIG. 8B illustrates a rear perspective view of an embodiment of an electrical wall plate spaced away from an embodiment of an electrical device.
Figure 8A:
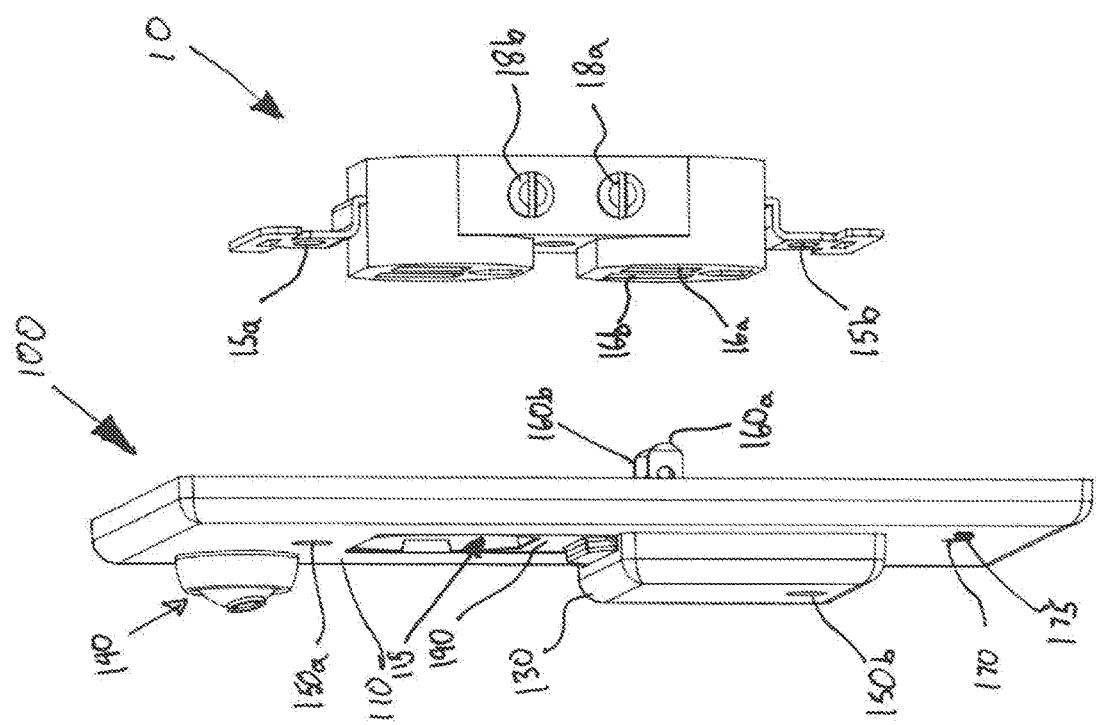
FIG. 8A illustrates a front perspective view of an embodiment of an electrical wall plate spaced away from an embodiment of an electrical device.
Figure 9B:
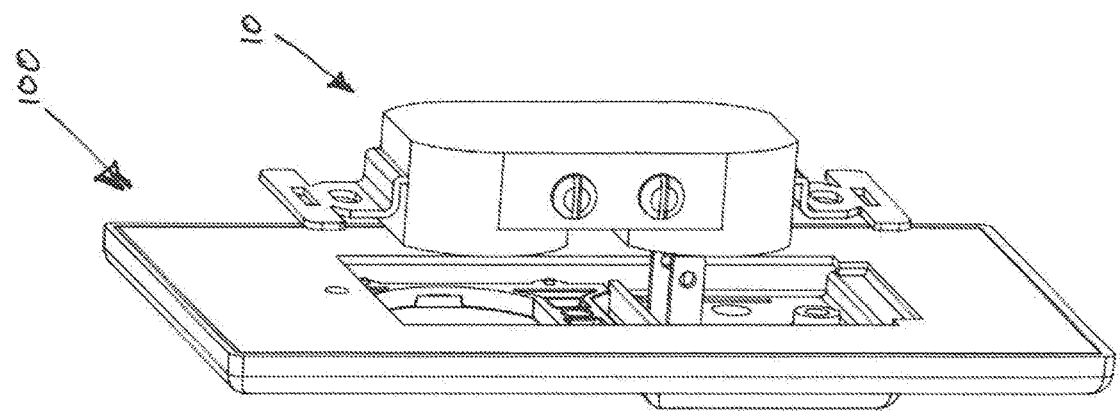
FIG. 9B illustrates a rear perspective view of the embodiments of the electrical wall plate and the electrical device of FIG. 8B just before engagement.
Figure 9A:
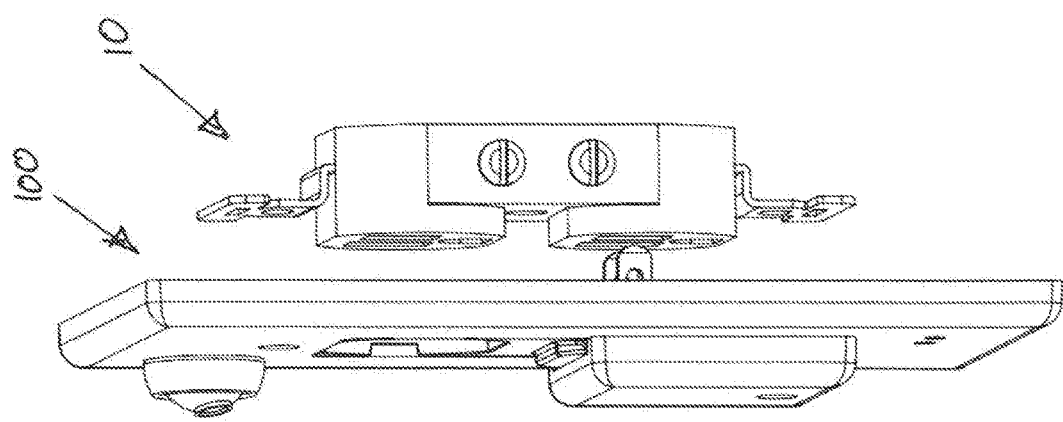
FIG. 9A illustrates a front perspective view of the embodiments of the electrical wall plate and the electrical device of FIG. 8A just before engagement.

With further reference to the drawings, FIGS. 2A-2D depict top, front, side and rear views, respectively, of the electrical wall plate of FIG. 1. As can be seen, embodiments of an electrical wall plate 100 may comprise a rear face plate 120 opposing the front face plate 110. Furthermore, embodiments of an electrical wall plate 100 may include a power connector 160. The power connector 160 may be located and structured so that it extends in a direction away from the front plate face 110 and protrudes beyond the rear face plate 120 of the electrical wall plate 100. Embodiments of a power connector 160 may be conductive and configured to electrically connect with a power transmission conductor of an electrical device (such as electrical power transmission conductors 16a and 16b, as well as 18a and 18b, of the electrical device 10 depicted in FIGS. 3, 8A and 8B, or the power transmission conductors 1018a and 1018b of electrical device 1000 depicted in FIGS. 14, 15c and 16, or other like power transmission conductors). The power connector 160 may be embodied as at least two electrical plug blades, such as electrical plug blades 160a and 160b, which perpendicularly protrude beyond the rear face plate 120 away from the front plate face 110. In particular, the side view of the electrical wall plate 100 depicted in FIG. 2C reveals a potential field of view 515 corresponding to the camera 140. A lens of the camera may operate to capture a field of view, such as field of view 515, exposed to the front plate face 110 of the electrical wall plate 100.

Figure 3:
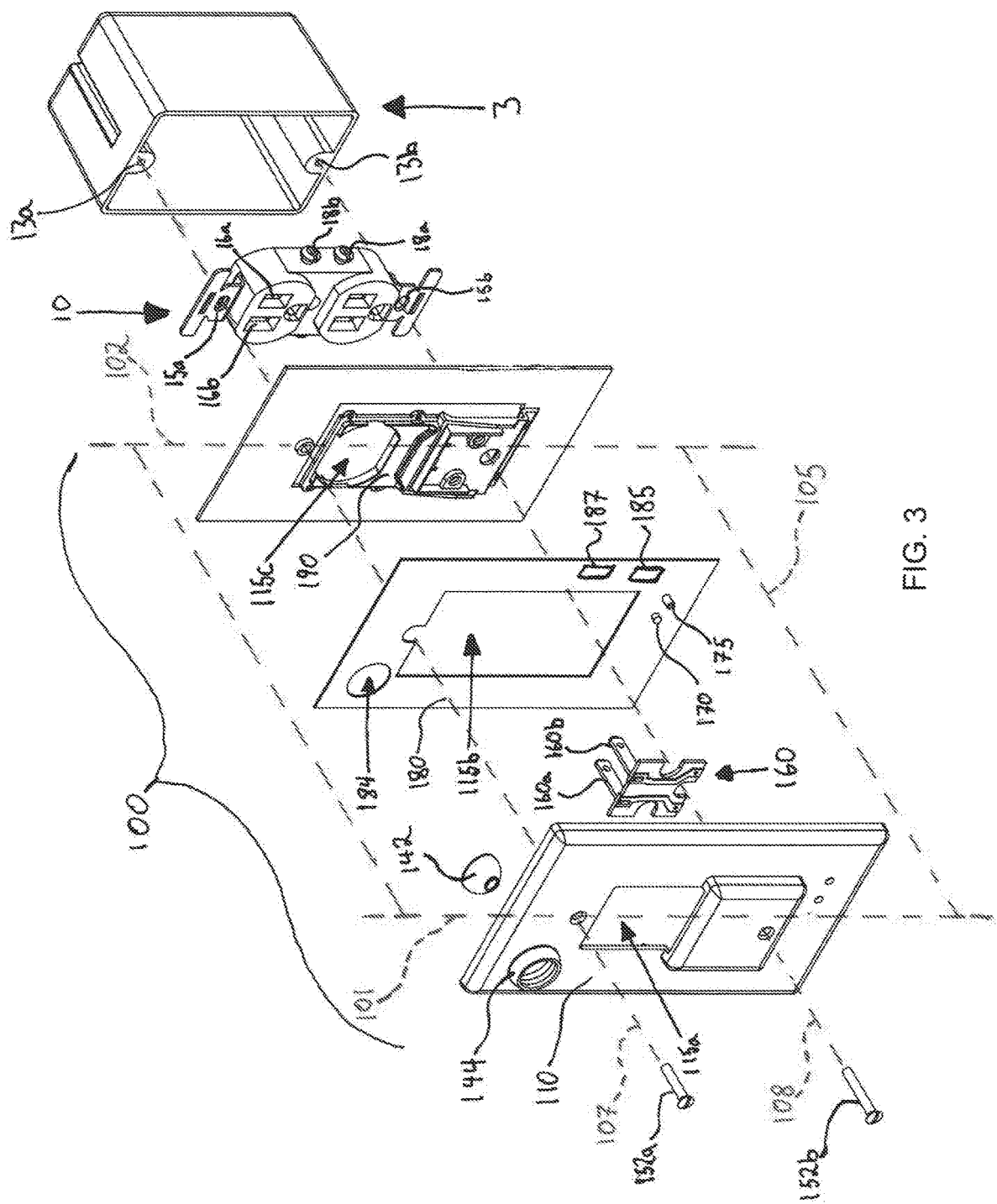
FIG. 3 illustrates an exploded perspective view of the electrical wall plate of FIG. 1, as well as an embodiment of an electrical device and an embodiment of an electrical box.

Various components potentially integrated into embodiments of an electrical wall plate 100 are additionally revealed in the exploded perspective view depicted in FIG. 3. As illustrated, embodiments of an electrical wall plate 100 may include a printed circuit board (PCB) 180. The PCB 180 may include an electrical device opening 115b corresponding to the respective electrical device openings 115a and 115c respectively extending through the front plate face 110 and the rear plate face 120 of the electrical wall plate 100, wherein the three openings 115a-c, may together comprise an electrical device opening 115 through the entire electrical wall plate 100. Likewise, the PCB 180 may be configured to include one or more openings, such as box mounting screw openings 150a and 150b, that extend through the entire electrical wall plate 100. Each of the one or more box mounting screw openings 150a and 150b may be positioned so as to extend through both the front plate face 110 and the rear plate face 120 in a direction congruent with the plane 105 extending between the center vertical axis 101 of the front plate face 110 and the center vertical axis 102 of the rear plate face 120. Moreover, the one or more box mounting screw openings may be configured to receive fasteners, such as box mounting screws 152a and 152b. In addition, when the one or more corresponding box mounting screws 152a and 152b are received within the box mounting screw openings 150a and 150b, the box mounting screws 152a and 152b may facilitate fastening of the electrical wall plate 100 to an electrical device 10, such as a light switch or an electrical receptacle. Like the electrical device opening 115, the one or more box mounting screw openings 150a and 150b may also be symmetrically centered along a center vertical plane 105 oriented perpendicularly to the electrical wall plate. The one or more box mounting screw openings 150a and 150b may be positioned to permit insertion and transversal by one or more respective box mounting screws 152a and 152b, such as along one or more respective insertion axis 107 and 108, in a manner wherein the one or more box mounting screws 152a and 152b, when inserted through the one or more box mounting screw openings 150a and 150b, extend into one or more corresponding openings 15a and 15b of an electrical device and also extend into one or more corresponding openings 13a and 13b of an electrical box 3 and facilitate fastening of the electrical wall plate 100 to both the electrical device 10, such as a light switch or an electrical receptacle, and the electrical box 3.

Referring still to FIG. 3 the PCB 180 may be configured to accommodate fastener openings, such as the one or more box mounting screw openings 150a and 150b. Furthermore, the PCB 180 may be in electrical communication with the camera 140 and the power connector 160. Embodiments of the camera 140 may include a swivel housing 144 and a swivel lens 142. The lens 142 may be configured to pan, tilt and/or zoom. In addition, embodiments of the camera 140 may physically and electrically connect a camera interface component 184 of the PCB 180. Thus, control elements of the PCB 180 may control functionality of the camera 140. The camera 140 may be in electrical connection with the power connector 160 and the PCB 180 and may include powered mechanical elements associated with panning, tilting, and/or zooming. The electrical power connector 160 may include a plurality of connecting features, such as electrical plug blades 160a and 160b. Those of ordinary skill in the relevant art will recognize the electrical plug blades, such as electrical plug blades 160a and 160b, may be structures having standardized dimension and conductivity in compliance with common electrical devices, such as plug and receptacle features having standardized dimensions associated with various geographic regions. For instance, as depicted, the electrical plug blades 160a and 160b are structured in accordance with typical plug blade structure in the United States and Canada. However, plug blades, or rather electrical power connector 160 features of embodiments of an electrical wall plate 100 may be structured in accordance with other geographic areas, such as continental Europe, the UK, Australia, China, Japan and any other geographic area having known standardized structure and performance requirements. Likewise, those of ordinary skill in the art will recognize that the component elements of an electrical wall plate 100 may be configured for operation applicable to any voltage, amperage, frequency, wattage, and/or other like electromagnetic characteristic commensurate with standardized functional requirements pertaining to any geographical area. The PCB 180 and other electronic components, such as the camera 140 may function with assistance of known conversion elements, such as operation by transformers, resisters, capacitors, diodes, transistors, A/D converters, integrated circuits and/or other like basic electronic components.

The PCB 180 may facilitate signal processing, device control, signal transmission, data manipulation and storage, user interface and control, and other like functionality. For example, a transmitter 185, such as a powered antenna, may be in electrical communication with the PCB 180. Moreover, a memory storage device 187 may also be in electrical communication with the PCB. The memory storage device 187 may be a permanent hard-wired structure or may be a removable device, such as a memory card. Devices, in communication with the PCB 180, may operate with electronic components including other separate PCBs, and/or may facilitate functionality of electronic components, such as the camera 140. For instance, video images captured by the camera 140 may be processed through the PCB 180 and directed for storage in the memory storage device 187. Furthermore, video images captured by the camera 140 may be processed through the PCB 180 and directed for wireless transmission by the transmitter 185 to an external receiver. Such wireless transmission may include signal transmissions by the transmitter 185 to a wireless local area network receiver, such as a Wi-Fi® receiver, signal transmissions by the transmitter 185 to a wireless personal area network receiver, such as a Bluetooth® receiver, and/or the wireless transmissions may comprise other like electromagnetic signal transmissions. In addition, it is contemplated that the transmitter 185 may operate via the infrared spectrum, the ultraviolet spectrum, via visible laser light projections, via sonic or ultrasonic transmission, and/or by any other means of operable wireless signal transmission. Still further, the transmitter 185 may transmit over-wire signals, such as analog and/or digital signals passed through the power connector 160 to the electrical power lines connected to the electrical device to which the electrical wall plate 100 may be physically and/or electrically connected.

A button switch 175 may be in electrical communication with the PCB 180. The button switch 175 may facilitate pairing of the transmitter 185 with a wireless receiver. A plurality of button switches, such as button switch 175, may be integrated into an embodiment of and electrical wall plate 100. In addition, a light 170, such as a light emitting diode (LED), may be in electrical communication with the PCB 180. The light 170 may function to visually represent operation of one or more electronic components of the electrical wall plate 100. For instance, the light 170 may blink while the transmitter 185 is pairing with an external receiver, to indicate that the pairing process is properly occurring, it may emit a steady color to indicate normal functionality, it may provide a series of pulses corresponding to user programming instructions and user interfacing, it may turn on during camera 140 operation to indicate that the camera 140 is properly functioning, and/or the light 170 may be utilized for any other means of information conveyance and user-engagement.

Figure 4:
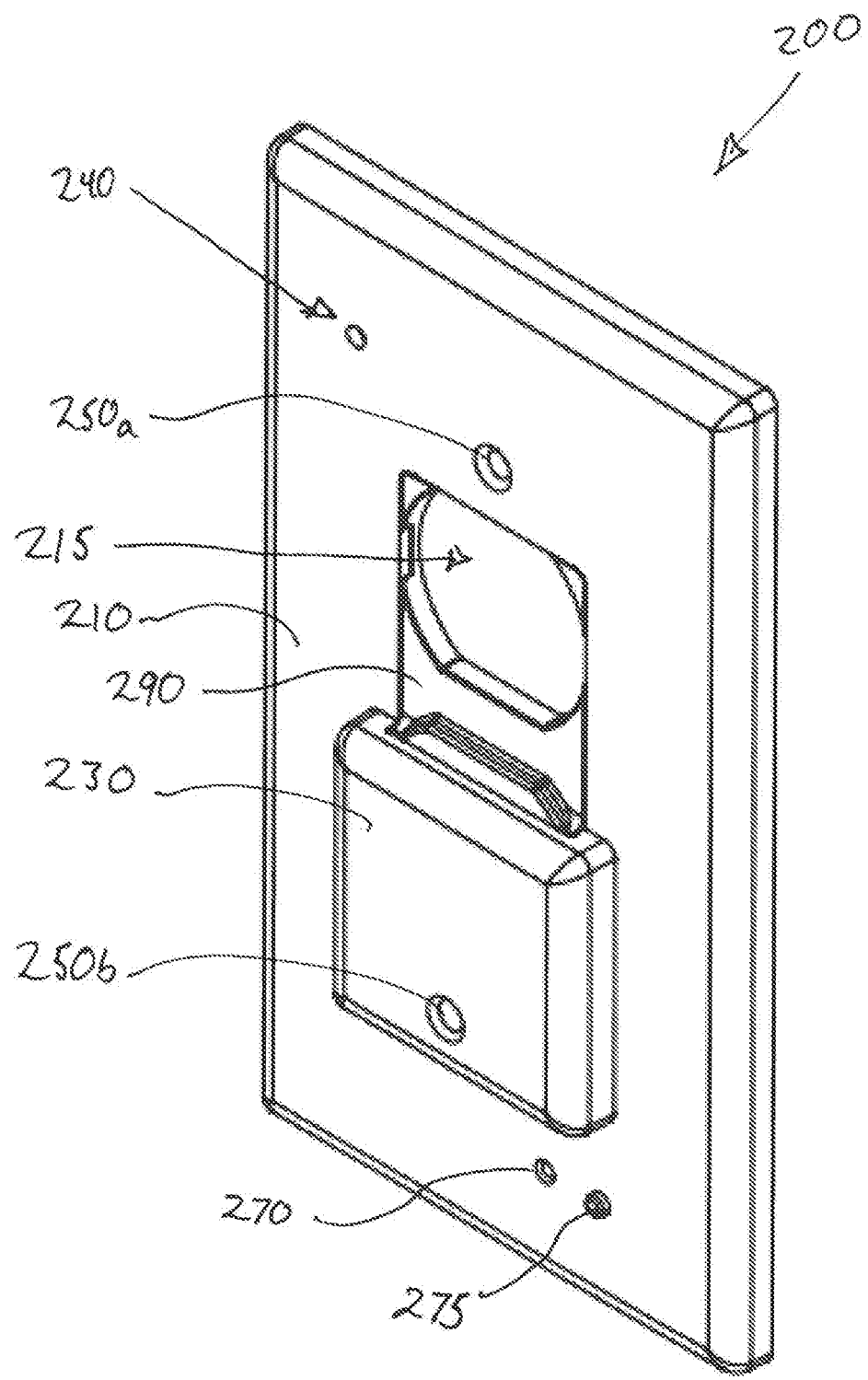
FIG. 4 illustrates a perspective view of another embodiment of an electrical wall plate comprising an integral electronic component.

With further reference to the drawings, FIG. 4 depicts a perspective view of another embodiment of an electrical wall plate 200 comprising an integral electronic component, such as a camera 240. Many structural and functional aspects of an embodiment of an electrical wall plate 200 may be similar to corresponding structural and functional aspects of an embodiment of an electrical wall plate 100. Moreover, the perspective view associated with the elemental features depicted in FIG. 4 has been presented in a manner similar to FIG. 1, and those in the art will appreciate that various axis and planar configurations corresponding to the electrical wall plate embodiment 100 of FIG. 1 likewise correspond to structural features depicted in FIG. 4. In addition, numeration of component features has been similarly set forth, wherein an embodiment of an electrical wall plate 200 may include a front plate face 210, a rear plate face 220, and an electrical device opening 215 that may extend through the front plate face 210 and rear plate face 220 of the electrical wall plate 200. The electrical wall plate 200 may also include a housing 130 that may house electronic components. Similarly, embodiments of an electrical wall plate 200 may include openings, such as box mounting screw openings 250a and 250b, that extend through the electrical wall plate 200, as well as an adapter 290 configured to adapt the electrical wall plate 200 to a corresponding structural configuration of an electrical device to which the electrical wall plate 200 will be mounted. The electrical wall plate 200 may include integral electronic components such as a light 270 and a button switch 275. Furthermore, an electrical wall plate 200 may include a power connector 260 configured to conductively engage an electrical device, such as by electrical plug blades 260a and 260b, or by other conductive elements provided to engage the power transmission features of the electrical device.

In contrast to an electrical wall plate 100, embodiments of an electrical wall plate 200 may include a camera 240 that operates with a wide-angle lens located in a key-hole aperture of the front plate face 210. The top, front, side and rear view depictions of FIGS. 5A-5D further illustrate the differing structure and functionality of an electrical wall plate 200. For example, as illustrated, the wide-angle view lens of camera 240 may be configured to capture a field of view 525 having a noticeably wider range than the field of view 515 associated with camera 140 of an embodiment of electrical wall plate 100.

Certain embodiments of an electrical wall plate, such as electrical wall plates 100 and 200 and other electrical wall plate embodiments, may be configured to operate with an electrical plug, such as electrical plug 1. The electrical plug 1 may comprise an electrical connector on the end of an electrical cord 2. The electrical plug, such as electrical plug 1, may comprise at least one male conductive member, such as electrical plug blades 6a-6c. Those of ordinary skill in the relevant art will appreciate that the size and geometry of the electrical plug 1, along with the size and relative positioning of the at least one male conductive member, such as electrical plug blades 6a-6c, may be structured in accordance with standard requirements set forth by various geographic regions. As depicted, the embodiment of the electrical plug 1 is structured to comport with structural standards pertaining to the United States and Canada.

Electrical wall plate embodiments, as disclosed herein, may be configured to mount to and operate with different electrical devices, such as light switches and electrical receptacles, or socket fixtures. For example, FIGS. 7A-7C each illustrate front perspective views of various respective embodiments of electrical wall plates 100, 300 and 400, each electrical wall plate 100, 300 and 400 being partially mounted onto, or otherwise engaged with, a corresponding electrical device 10, 30 and 40. The respective electrical device openings 115, 315 and 415 may be sized to facilitate operable engagement with the electrical devices 10, 30 and 40. For example, and adapter 190 may be incorporated in the electoral wall plate 100, to size and structure the opening 115 to match the structural features of the electrical device 10. As depicted in FIG. 7A, the electrical device 10 is a common duplex receptacle utilized in the United States and Canada. The electrical device depicted in FIG. 7B is a standard flat-face NEMA receptacle fixture. The electrical device 40, as depicted in FIG. 7C, is a common ground fault circuit interrupter (GFCI) electrical receptacle utilized in the United States and Canada. The electrical device opening 415 of the electrical wall plate 400 may be sized to facilitate access to a "Test" button and a "Reset" button commonly found on the receptacle face of the standard GFCI receptacle.

Embodiments of an electrical wall plate, such as electrical wall plates 100, 200, 300, 400 and the like, may be configured to connect with a power transmission conductor of an electrical device, such as a light switch, or an electrical receptacle, such as, for example, electrical receptacle devices 10, 30 and 40. With continued reference to the drawings, FIGS. 8A-9B depict front and rear perspective views of an embodiment of an electrical wall plate 100 spaced away, at different distances, from an electrical device 10, during pre-engagement action of the electrical wall plate 100 with regard to the electrical device 10. An opening, such as electrical device opening 115, may extend through the front plate face 110 and the rear plate face 120 of the electrical wall plate 100, wherein the electrical device opening 115 may be configured to permit a power transmission conductor, such as electrical plug blades 6a-6c, of an electrical power plug, such as power plug 1 (depicted in FIG. 6), to extend through the electrical device opening 115 and conductively engage with a power transmission component, such as female receivers 16a and 16b, of the electrical device 10 onto which the electrical wall plate 100 has been mounted. Integral electronic components, such as the camera 140, the light 170 and the button switch 175, may be in electrical connection with the power connector 160 for instance, having electrical plug blades 160a and 160b, and may be configured to operate by electrical power obtained from the electrical device 10, when the power connector 160 is connected to the power transmission conductor, such as female receivers 16a and 16b and/or wire mounts 18a and 18b, of the electrical device 10. The female receivers 16a and 16b may be configured to receive and electrically engage the electrical plug blades 160a and 160b, when the electrical wall plate 100 is mounted on the electrical device 10. Those of ordinary skill in the art will recognize that electrical connection between the electrical wall plate 100 and the electrical device 10 may be operatively effectuated by connection with the female receivers 16a and 16b and/or the wire mounts 18a and 18b, with each connection arrangement offering different advantages. For instance, electrical connection between the power connector 160, such as electrical plug blades 160a and 160b, and the female receivers 16a and 16b happens commensurate with the engagement of the electrical wall plate 100 with the electrical device 10, as the electrical wall plate 100 is mounted to the electrical device 10. A direct wired connection, utilizing a wired power connector 160 electrically connected with and physically mounted to the wire mounts 18a and 18b may facilitate continuous electrical connection of the electrical wall plate 100 with the electrical device 10, such as an electrical receptacle, even if the electrical wall plate 100 is spaced apart a distance from the electrical device 10 and not fully physically mounted and/or fastened thereto.

Electronic components integrated into the electrical wall plate 100, such as the camera 140, may be powered with electricity obtained through an electrical connection of the electrical wall plate 100 and the electrical device 10 via engagement and reception of the power connector 160, such as electrical plug blades 160a and 160b, with the power transmission conductor, such as female receivers 16a and 16b, of the electrical device 10. FIG. 10A depicts a front view of an embodiment of an electrical wall plate 100 mounted to an electrical device 10. Fasteners, such as one or more box mounting screws 152a and 152b, may be inserted into pass or transverse through and potentially engage one or more openings 150a and 150b of the electrical wall plate 100 and pass through or engage with the one or more corresponding openings 15a and 15b of the electrical device 10. This engagement orientation is also revealed in FIG. 10B, which depicts a side cross section view of the electrical wall plate 100 mounted to the electrical device 10 illustrated in FIG. 10A. Also revealed in the side cross section view of FIG. 10B is the PCB 180 located between the front plate face 110 and the rear plate face 120.

Figure 11:
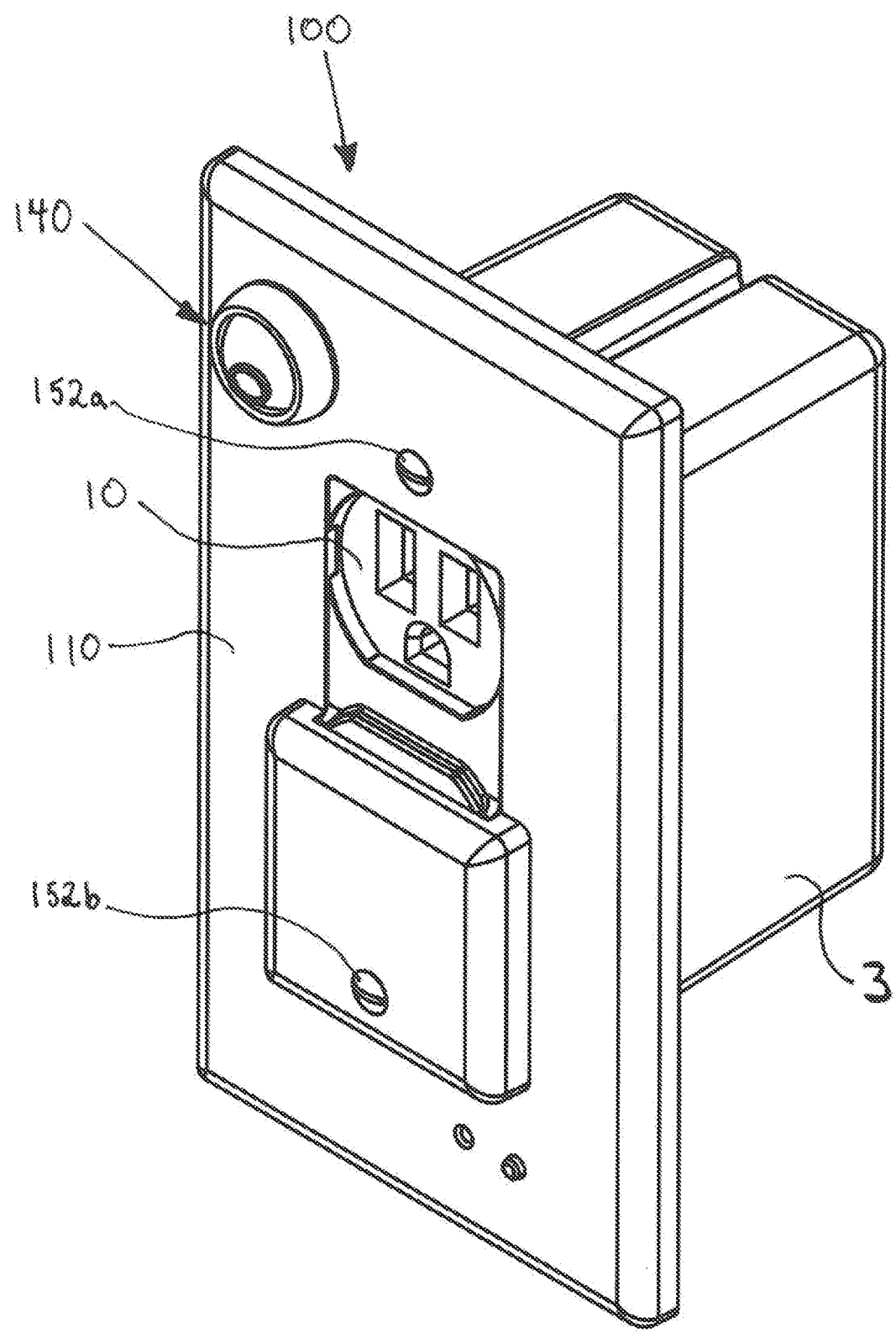
FIG. 11 illustrates a front perspective view of an embodiment of an electrical wall plate mounted to an embodiment of an electrical device and mounted to an embodiment of an electrical box.
Figure 12:
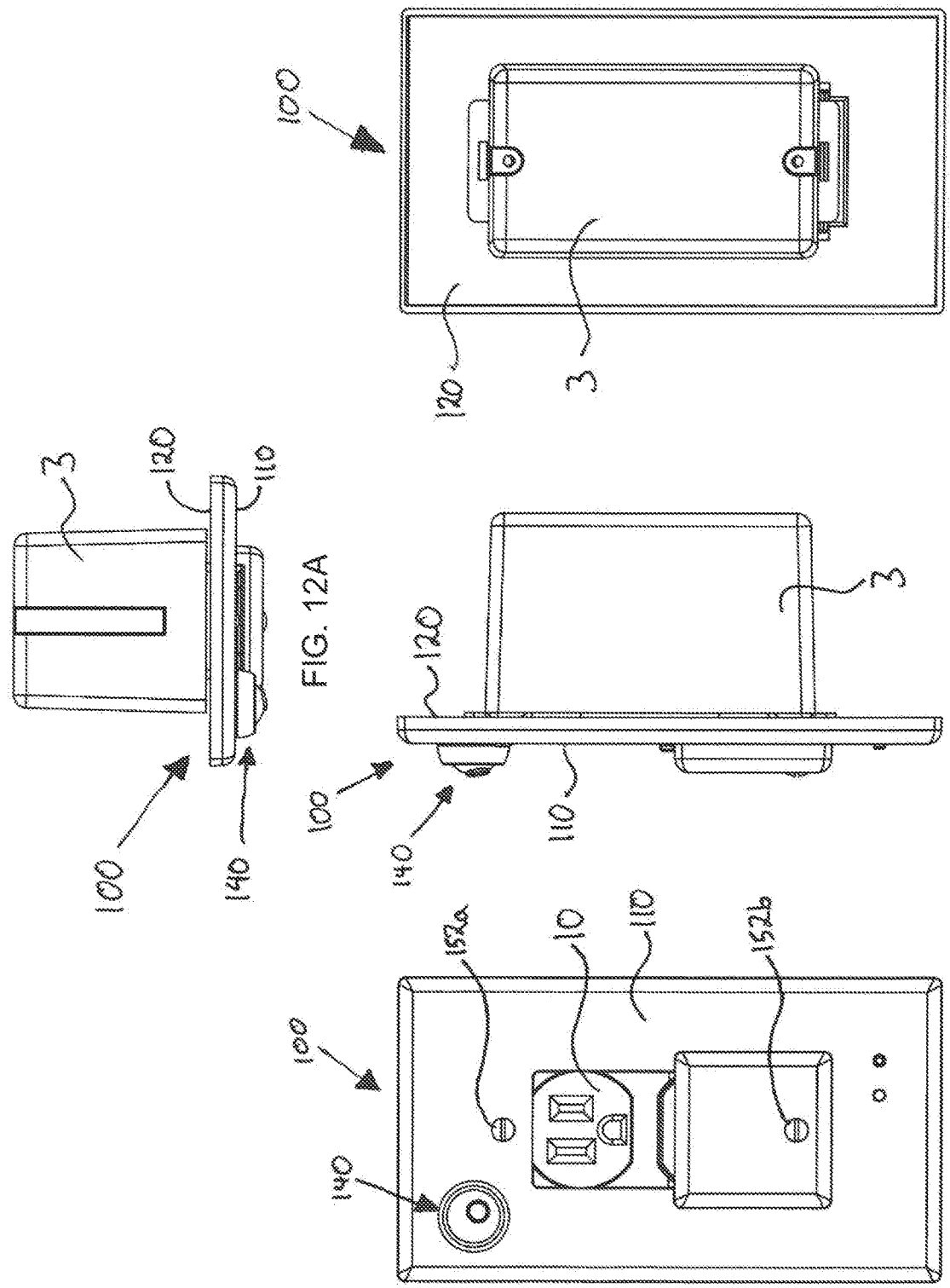
FIG. 12A illustrates a top view of the electrical wall plate mounted to the embodiment of the electrical device and the embodiment of the electrical box of FIG. 11.
FIG. 12B illustrates a front view of the electrical wall plate mounted to the embodiment of the electrical device and the embodiment of the electrical box of FIG. 11.
FIG. 12C illustrates a side view of the electrical wall plate mounted to the embodiment of the electrical device and the embodiment of the electrical box of FIG. 11.
FIG. 12D illustrates a rear view of the electrical wall plate mounted to the embodiment of the electrical device and the embodiment of the electrical box of FIG. 11.

With continued reference to the drawings, FIG. 11 depicts a front perspective view of an embodiment of an electrical wall plate 100 mounted to an embodiment of an electrical device 10, such as duplex-type electrical receptacle, and mounted to an embodiment of an electrical box 3. The top, front, side and rear view depictions of FIGS. 12A-12D further illustrate the structure and functionality of an electrical wall plate 100 mounted to both an electrical device 10 and an electrical box 3. As depicted, the electrical box 3 may reside on the side of the electrical wall plate 100 associated with the rear plate face 120, while the camera 140 may reside on the side of the electrical wall plate 100 associated with the front plate face 110. The electrical device 10, such as an electrical receptacle, may reside substantially within the electrical box 3, and may include electrical connection features that are accessible when the electrical box 3 is mounted to the electrical wall plate 100.

Figure 13:
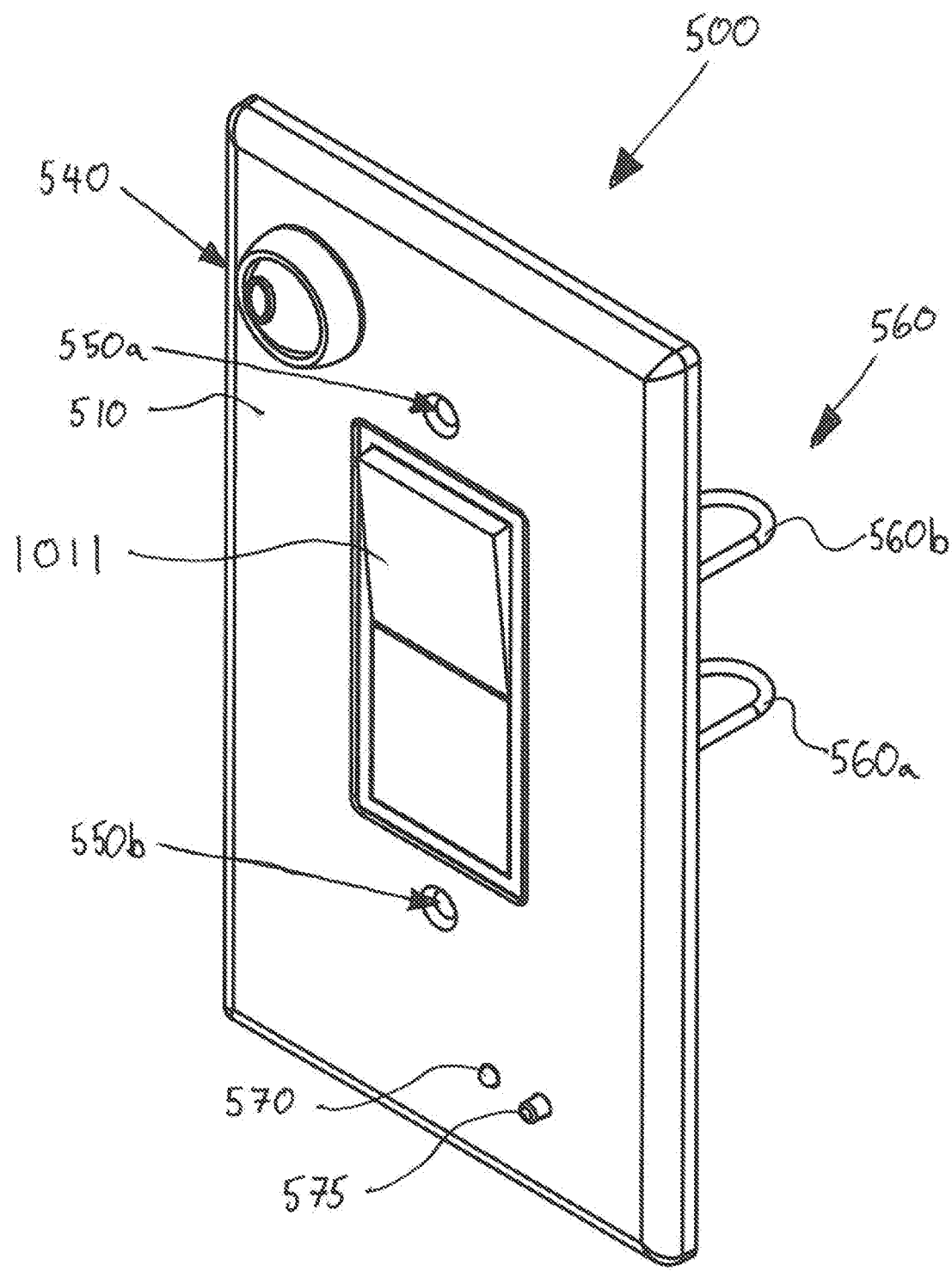
FIG. 13 illustrates a front perspective view of yet another embodiment of an electrical wall plate engaged with another embodiment of an electrical device.

FIG. 13 depicts a front perspective view of yet another embodiment of an electrical wall plate 500 engaged with another embodiment of an electrical device 1000, such as a light switch having a switch toggle 1011. Embodiments of an electrical wall plate 500 may comprise an integral electronic component, such as a camera 540. Many structural and functional aspects of an embodiment of an electrical wall plate 500 may be similar to corresponding structural and functional aspects of embodiments of electrical wall plates 100, 200. 300 and 400. Moreover, the perspective view associated with the elemental features depicted in FIG. 13 has been presented in a manner similar to FIGS. 1, 4 and 11, and, again, those in the art will appreciate that various axis and planar configurations corresponding to the electrical wall plate embodiment 100 of FIG. 1 likewise correspond to structural features depicted in FIG. 13. In addition, numeration of component features has once more been similarly set forth, wherein an embodiment of an electrical wall plate 500 may include a front plate face 510, a rear plate face 520, and openings, such as box mounting screw openings 550a and 550b, that extend through the electrical wall plate 500. The electrical wall plate 500 may include integral electronic components such as a light 570 and a button switch 575. Furthermore, an electrical wall plate 500 may include a power connector 560 configured to conductively engage an electrical device, such as by electrical wire connectors 560a and 560b, or by other conductive elements provided to engage the power transmission features of the electrical device, such as a light switch 1000.

Figure 14:
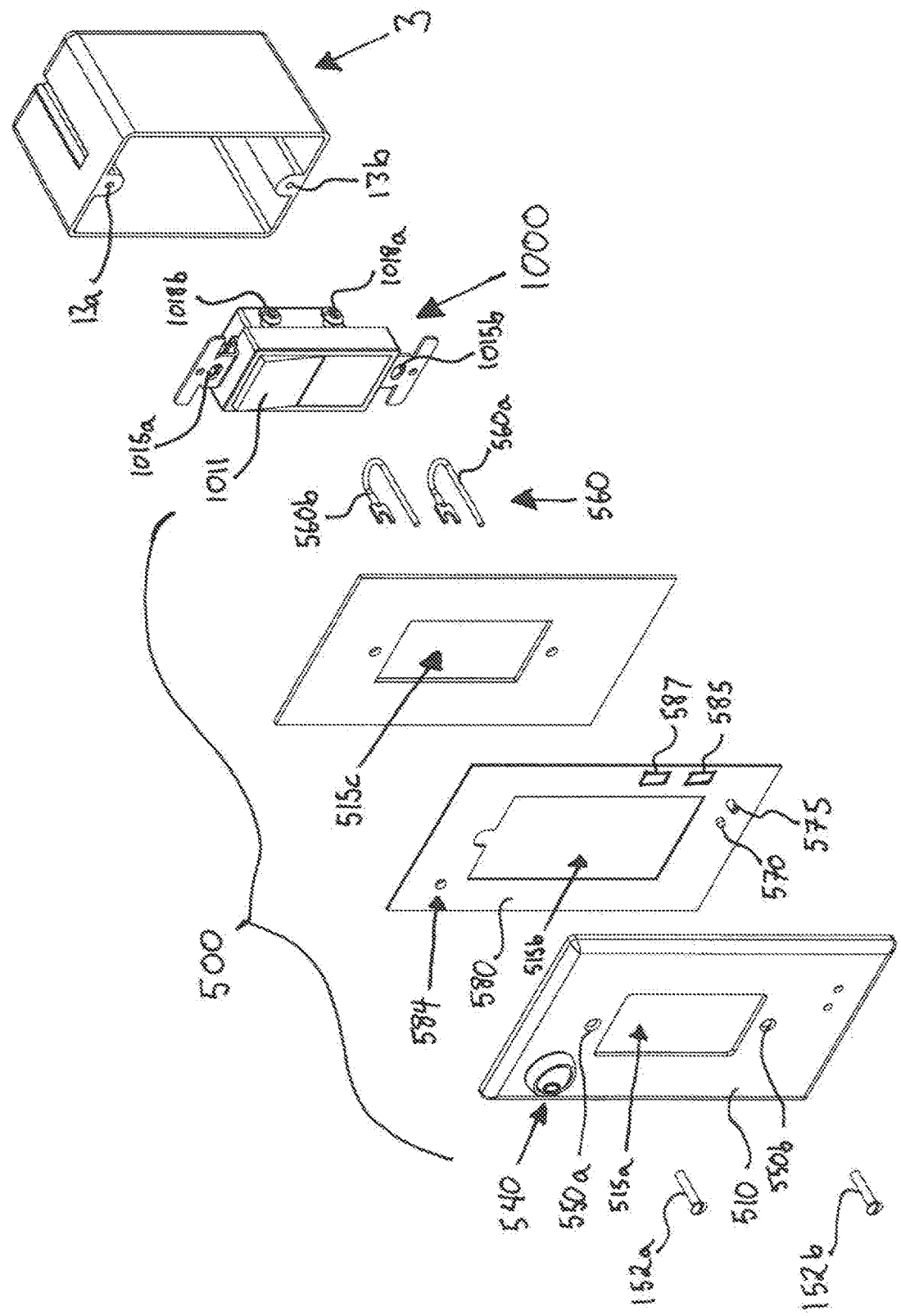
FIG. 14 illustrates an exploded perspective view of the electrical wall plate and the electrical device of FIG. 13, as well as an embodiment of an electrical box.
Figure 15:
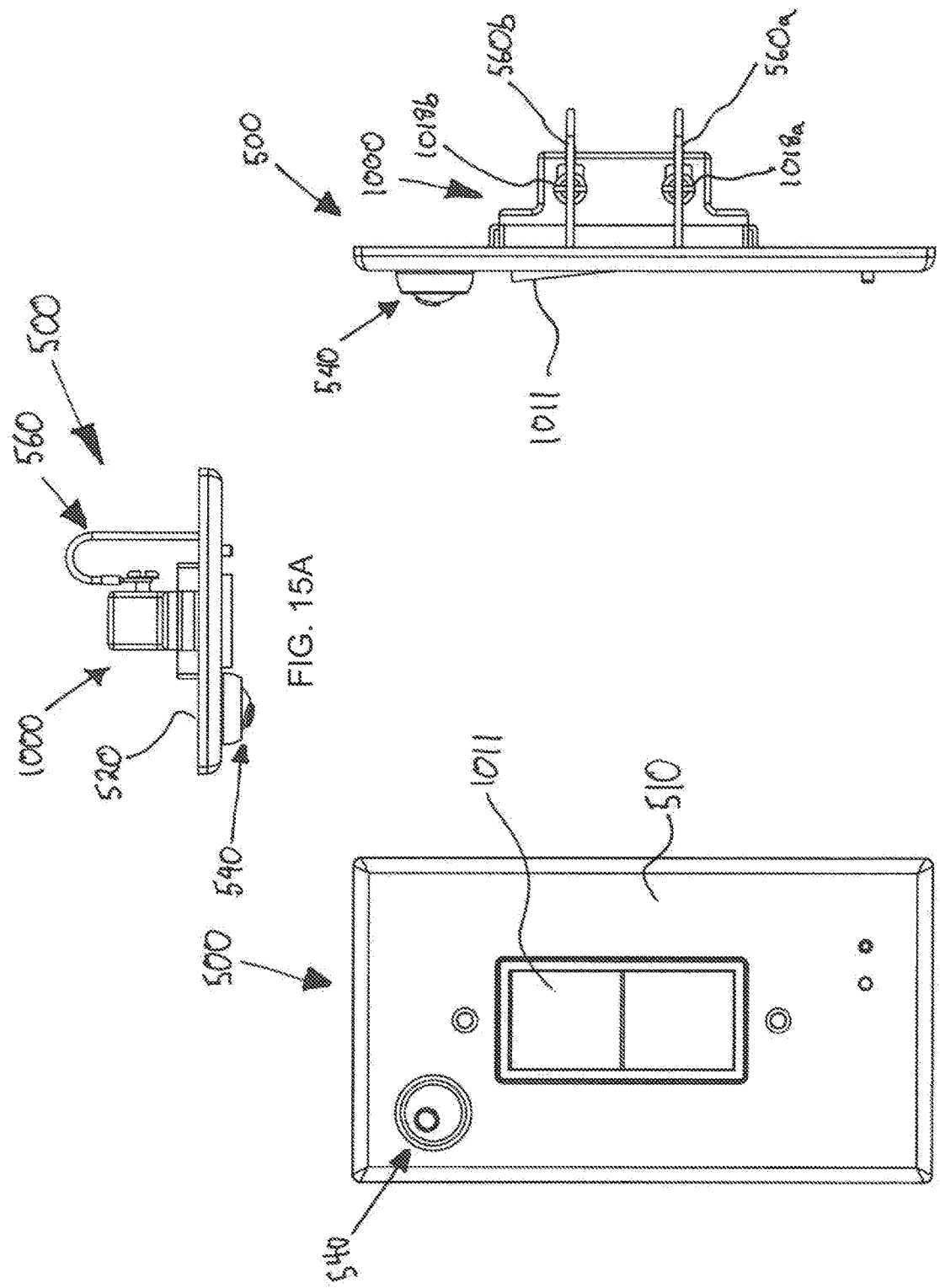
FIG. 15A illustrates a top view of the electrical wall plate engaged with the electrical device of FIG. 13.
FIG. 15B illustrates a front view of the electrical wall plate engaged with the electrical device of FIG. 13.
FIG. 15C illustrates a side view of the electrical wall plate engaged with the electrical device of FIG. 13.
Figure 16:
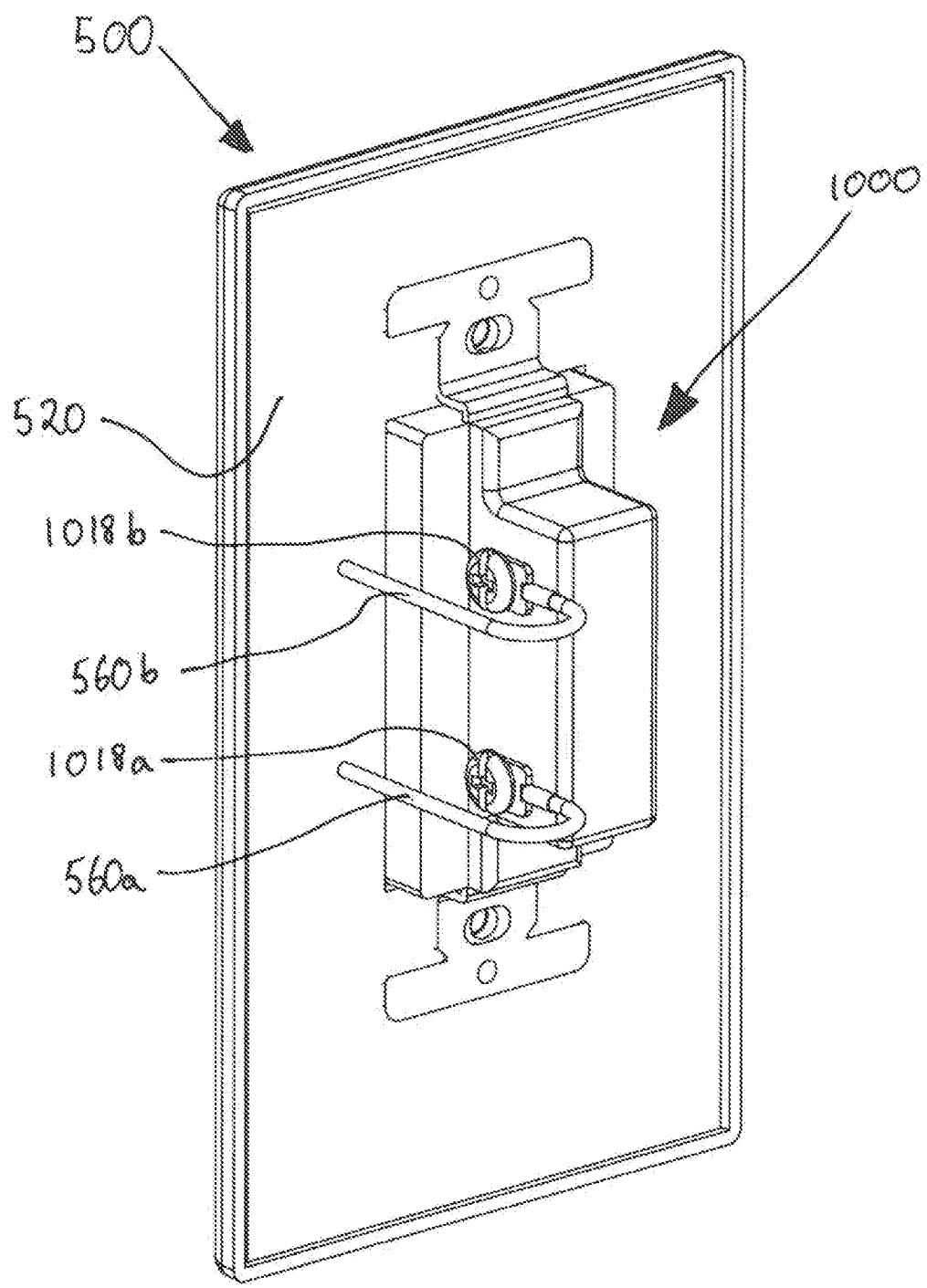
FIG. 16 illustrates a rear perspective view of the electrical wall plate engaged with the electrical device of FIG. 13.

As depicted in exploded format in FIG. 14, embodiments of an electrical wall plate 500 may engage with and mount to electrical devices, such as light switch 1000 and also to electrical device housings, such as electrical box 3. Noticeably, there are several openings that extend through the various component elements of the electrical wall plate 500. For example, the combination of opening 515a through front plate face 510, along with opening 515b through the PCB 580, as well as opening 515c through the rear plate face 520, may combine to form a composite electrical device opening 515. In addition, openings for fasteners, such as one or more box mounting screw openings 550a and 550b, may extend through the entirety of the electrical wall plate 500, thereby permitting one or more box mounting screws 152a and 152 be to fasten the electrical device 1000, such as the light switch and the electrical box 3 to the electrical wall plate 500, by interacting with openings 1015a and 1015b of the electrical device 1000 and with openings 13a and 13b of the electrical box 3. The printed circuit board 580 may be electrically connected to the power transmission conductor screws 1018a and 1018b of the electrical device 1000, such as a light switch, by means of the power connector 560 respective component wire connectors 560a and 560b. Power accessible via the electrical connection to the electrical device 1000 may be turned on and off via a toggle switch 1011 of the electrical device 1000. The PCB 580 may drive operations pertaining to the camera 540, a light 570, memory storage 587, a transmitter 585, and an interactive button switch 575. The top, front, side and rear view depictions of FIGS. 15A-15C further illustrate the structure and functionality of an electrical wall plate 500 engaged with an electrical device 1000, while FIG. 16 illustrates a rear perspective view of the electrical wall plate 500 engaged with the electrical device 1000. Those of ordinary skill in the art will recognize that various electrical devices 1000, may engage the electrical wall plate 500. For example, differently embodied electrical devices 1000, such as electrical switches having different toggle switch 1011 configurations, may be operably engaged with an electrical wall plate 500.

Figure 17:
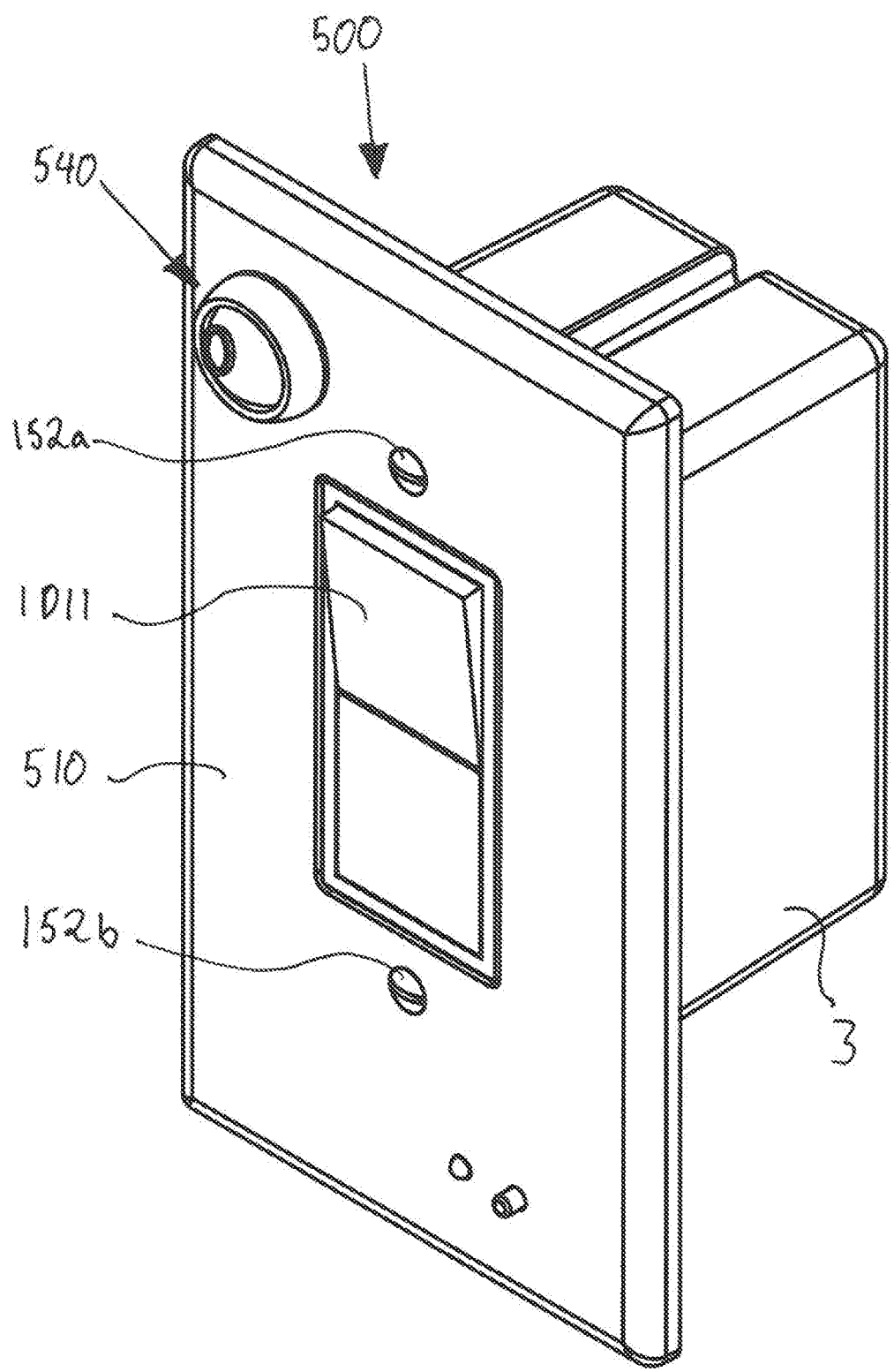
FIG. 17 illustrates a front perspective view of an embodiment of an electrical wall plate mounted to an embodiment of an electrical device and mounted to an embodiment of an electrical box.
Figure 18A:
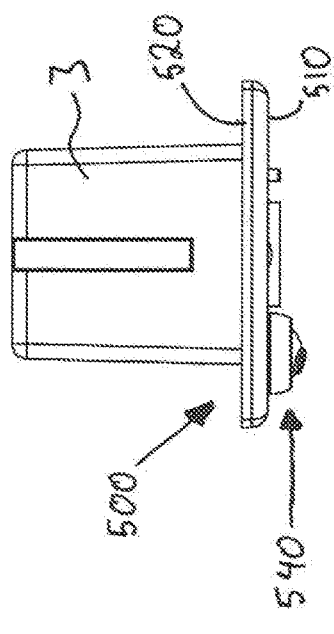
FIG. 18A illustrates a top view of the electrical wall plate mounted to the embodiment of the electrical device and the embodiment of the electrical box of FIG. 17.
Figure 18C:
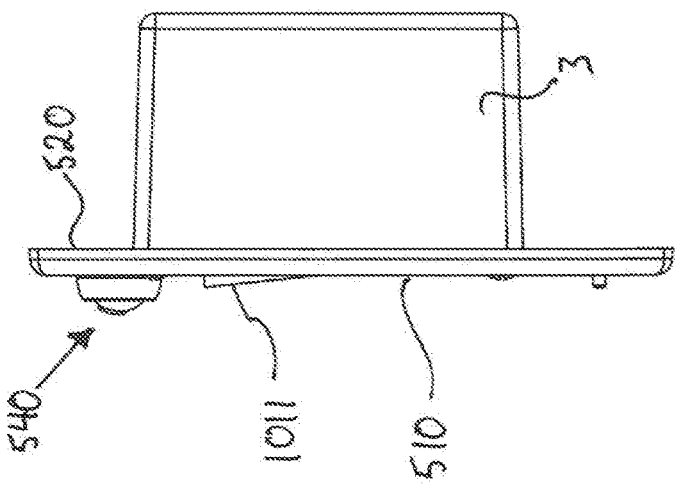
FIG. 18C illustrates a side view of the electrical wall plate mounted to the embodiment of the electrical device and the embodiment of the electrical box of FIG. 17.
Figure 18B:
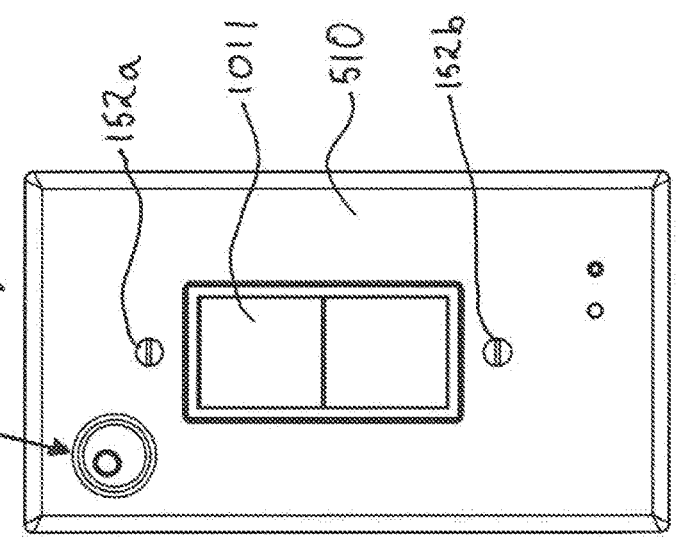
FIG. 18B illustrates a front view of the electrical wall plate mounted to the embodiment of the electrical device and the embodiment of the electrical box of FIG. 17.
Figure 19:
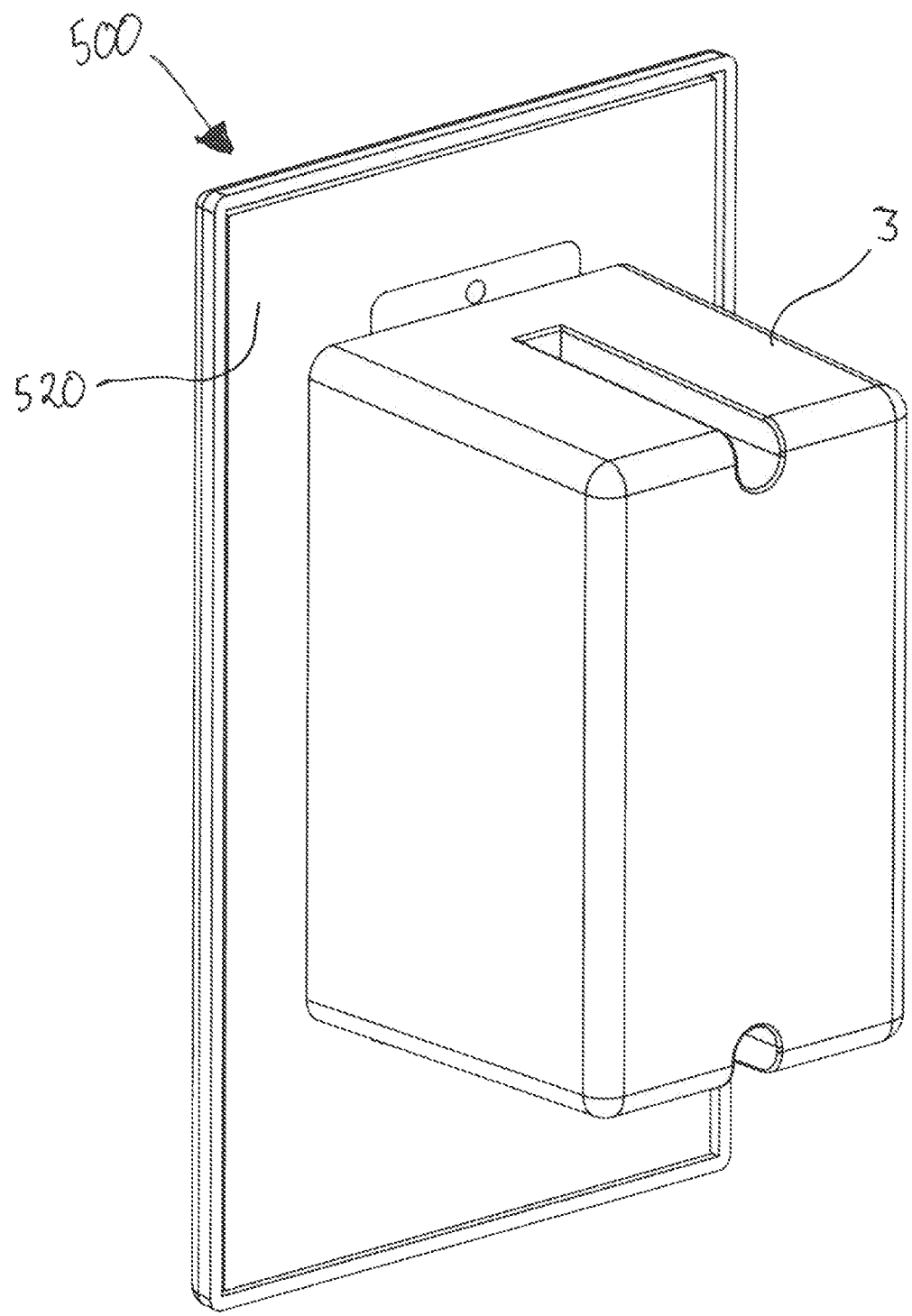
FIG. 19 illustrates a rear perspective view of the electrical wall plate mounted to the embodiment of the electrical device and the embodiment of the electrical box of FIG. 17.

Embodiments of an electrical wall plate 500 may be mounted to an electrical box 3, such as depicted in front perspective view illustrated by FIG. 17. Moreover, as further depicted in the top, front and side views illustrated respectively by FIGS. 18A-18C, when mounted to the electrical box 3, the electronic component, such as camera 540, remains highly visible and capable of capturing video images of the environment located in front of the front plate face 510 of the electrical wall plate 500. Additionally, the rear perspective view afforded by FIG. 19 reveals how the rear plate face 520 of the electrical wall plate 500 may be flush-mounted to the electrical box 3 and thereby protect the electrical device 1000, such as a light switch housed by the electrical box 3, from undesired accessibility.

Figure 20:
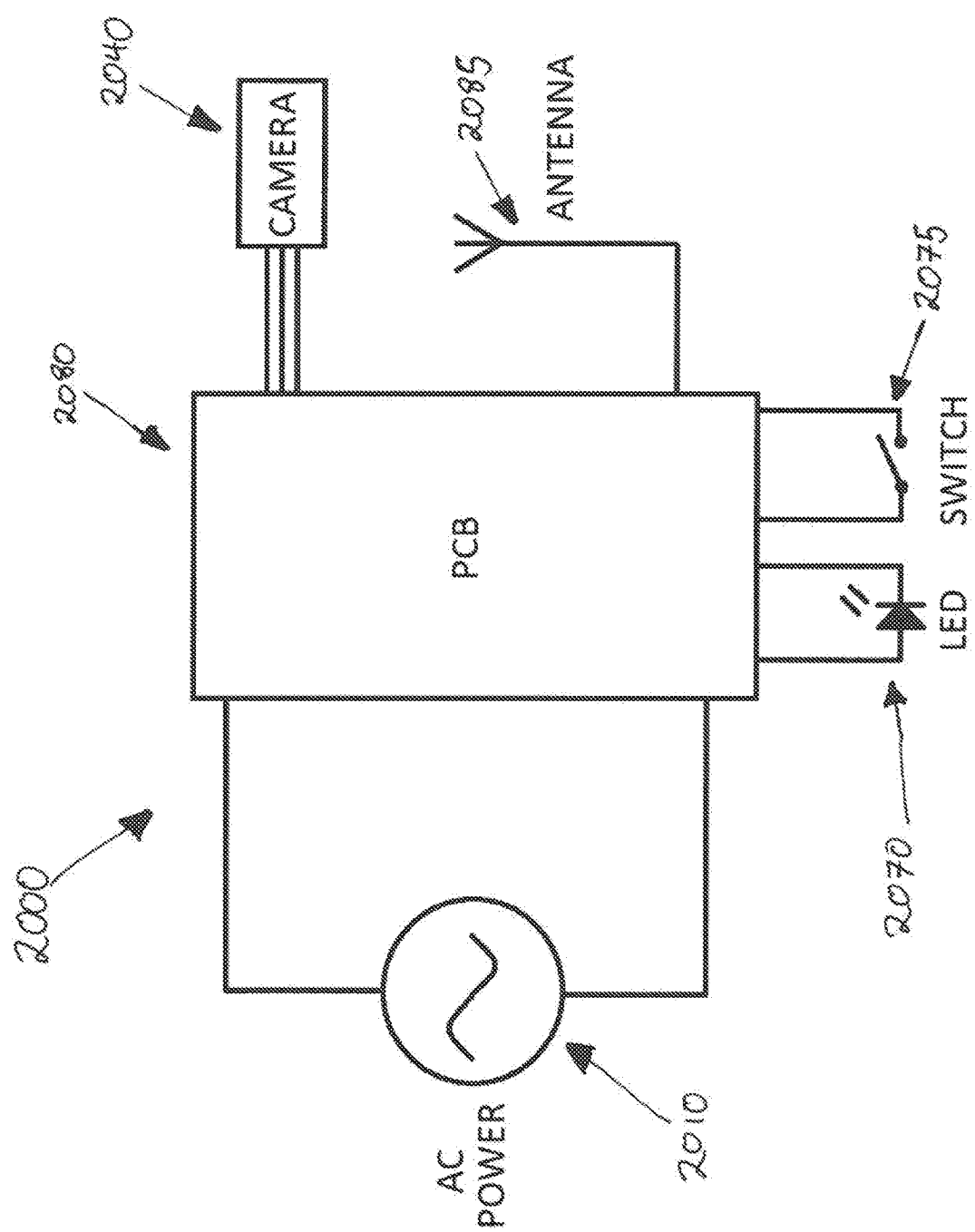
FIG. 20 illustrates a schematic view of an embodiment of an electrical circuit operably corresponding to an embodiment of an electrical wall plate comprising an integral electronic component.

Referring still further to the drawings, FIG. 20 depicts a schematic view of an embodiment of an electrical circuit 2000 operably corresponding to an embodiment of an electrical wall plate, such as electrical wall plates 100, 200, 300 and/or 400 comprising an integral electronic component such as cameras 140, 240, 340, 440 and 2040. A printed circuit board 2080 is electrically connected to the camera, such as camera 2040, AC electrical power 2010, an LED light 2070, a button switch 2075, and a transmitter antenna 2085. As shown schematically, when the camera, such as camera 2040, is electrically powered by electricity, such as AC power 2010, obtained through electrical connection of the electrical wall plate, such as electrical wall plate 100, 200, 300, 400, and the electrical receptacle 10, 30 and 40, the electrically connected PCB 2080 may help facilitate controlled operation of the camera 2040.

While this disclosure has been described in conjunction with the specific embodiments outlined above, it is evident that many alternatives, modifications and variations will be apparent to those skilled in the art. Accordingly, the described and depicted embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. An electrical wall plate comprising:
a front plate face having a center vertical axis;
a rear plate face opposing the front plate face and having a center vertical axis congruent with the center vertical axis of the front plate face, so that there is a plane extending between the center vertical axis of the front plate face and the center vertical axis of the rear plate face, wherein the plane is perpendicular to at least a portion of both the front plate face and the rear plate face;
at least one electrical receptacle opening extending through the front plate face and the rear plate face, wherein the at least one electrical receptacle opening is symmetrically bifurcated by the plane extending between the center vertical axis of the front plate face and the center vertical axis of the rear plate face, and is configured to expose an electrical receptacle therethrough;
at least one box mounting screw opening, wherein the at least one box mounting screw opening is positioned so as to extend through both the front plate face and the rear plate face in a direction congruent with the plane extending between the center vertical axis of the front plate face and the center vertical axis of the rear plate face, and further wherein the at least one box mounting screw opening is configured to receive a box mounting screw so that the box mounting screw, when received, facilitates fastening of the electrical wall plate to the electrical receptacle;
a box mounting screw configured to couple the electrical wall plate to the electrical receptacle through the at least one box mounting screw opening;
a power connector comprising at least two male electrical plug blades extending in a direction away from the front plate face, and configured to align with and electrically couple with at least two female electrical receptacle apertures in the electrical receptacle; and
a camera integrated with the front plate face, the camera electrically coupled with and configured to receive power through the at least two male electrical plug blades, and configured to operate by power obtained from the electrical receptacle through the at least two male electrical plug blades when the at least two male electrical plug blades are inserted into the at least two female electrical receptacle apertures of the electrical receptacle.

2. The electrical wall plate of claim 1, wherein the electrical receptacle is mounted in an electrical box.

3. The electrical wall plate of claim 1, wherein the at least one electrical receptacle opening is configured to permit a male conductive member of an electrical power plug to extend through the electrical receptacle opening and engage with a female receiver of the electrical receptacle.

4. The electrical wall plate of claim 1, wherein the camera operates with a swivel lens configured to move and point in different directions.

5. The electrical wall plate of claim 1, wherein the camera operates with a wide-angle lens located in a key-hole aperture of the front plate face.

6. The electrical wall plate of claim 1, further comprising a printed circuit board in electrical communication with the camera and the power connector.

7. The electrical wall plate of claim 1, further comprising a transmitter.

8. The electrical wall plate of claim 1, further comprising a button switch configured to facilitate manual operation of at least one of the camera or a transmitter.

9. The electrical wall plate of claim 1, further comprising a light electrically connected to and configured to receive electrical power through the at least two male electrical plug blades.

10. A method of capturing video images, the method comprising:
providing an electrical wall plate having at least two openings extending through the electrical wall plate and positioned so that each of the at least two openings is symmetrically centered along a center vertical plane oriented perpendicularly to the electrical wall plate, wherein the electrical wall plate further includes at least two male electrical plug blades extending rearward from the electrical wall plate, a printed circuit board in electrical connection with the at least two male electrical plug blades, and a video camera in electrical connection with the printed circuit board;
providing an electrical receptacle, wherein the electrical receptacle includes at least two female electrical receptacle apertures configured to electrically engage the at least two male electrical plug blades of the electrical wall plate, and wherein at least one of the at least two openings is configured to expose the electrical receptacle therethrough, when the electrical wall plate is mounted to the electrical receptacle;
powering the camera with electricity obtained from the at least two female electrical receptacle apertures of the electrical receptacle through the at least two male plug blades of the electrical wall plate; and
capturing video images by the camera, when the camera is electrically powered by electricity obtained through electrical connection of the electrical wall plate and the electrical receptacle.

11. The method of capturing video images of claim 10, further comprising storing the captured video images in a memory storage device electrically connected to the printed circuit board of the electrical wall plate.

12. The method of capturing video images of claim 10, further comprising transmitting the video images via a transmitter electrically connected to the printed circuit board of the electrical wall plate.

13. The method of capturing video images of claim 12, wherein the transmitter transmits signals to a wireless local area network receiver.

14. The method of capturing video images of claim 12, wherein the transmitter transmits signals to a wireless personal area network receiver.

15. The method of capturing video images of claim 10, utilizing a button switch on the electrical wall plate to facilitate pairing of the transmitter with a wireless receiver.

16. An electrical wall plate comprising:
a printed circuit board positioned between a front plate face and a rear plate face;
a receptacle opening extending through the front plate face and the rear plate face, wherein the receptacle opening is configured to expose an electrical receptacle therethrough;
at least one box mounting screw opening extending through the front plate face and the rear plate face, wherein the at least one box mounting screw opening is positioned to permit insertion and transversal by a box mounting screw in a manner wherein the box mounting screw, when inserted through the at least one box mounting screw opening, extends into a corresponding opening of the electrical receptacle and extends into a corresponding opening of an electrical box and facilitates fastening of the electrical wall plate to both the electrical receptacle and the electrical box;
a camera positioned so that a lens of the camera captures a field of view exposed to the front plate face; and
at least two power connectors extending away from the rear face plate and electrically coupled to the camera through the printed circuit board, the at least two connectors configured to be respectively aligned with at least two power transmission conductors of the electrical receptacle when the rear plate face is positioned upon the electrical receptacle and configured to provide electrical power from the electrical receptacle to the camera.

17. The electrical wall plate of claim 16, wherein the camera includes a pan, tilt and zoom lens configured to modify the direction and range of the field of view.

18. The electrical wall plate of claim 16, further comprising a transmitter configured to transmit signals corresponding to video images captured by the camera.

19. The electrical wall plate of claim 16, further comprising memory storage configured to store video images captured by the camera.

20. The electrical wall plate of claim 16, wherein the receptacle opening is further configured to permit electrical plug blades of an electrical power plug to extend through the receptacle opening and conductively engage with a female receiver of an electrical receptacle to which the electrical wall plate has been mounted.

\* \* \* \* \*